United States Patent
Wang et al.

(10) Patent No.: US 11,271,848 B2
(45) Date of Patent: Mar. 8, 2022

(54) DATA TRANSMISSION METHOD, APPARATUS, AND DEVICE

(71) Applicant: HUAWEI TECHNOLOGIES CO., LTD., Guangdong (CN)

(72) Inventors: Fanzhao Wang, Shenzhen (CN); Wei Liu, Shenzhen (CN); Kai Zheng, Beijing (CN); Weihua Li, Shenzhen (CN); Jun Yang, Dongguan (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 16/859,534

(22) Filed: Apr. 27, 2020

(65) Prior Publication Data

US 2020/0259738 A1 Aug. 13, 2020

Related U.S. Application Data

(63) Continuation of application No. PCT/CN2018/112250, filed on Oct. 27, 2018.

(30) Foreign Application Priority Data

Oct. 28, 2017 (CN) .......................... 201711094016.3

(51) Int. Cl.
  *G06F 15/16* (2006.01)
  *H04L 45/24* (2022.01)
  (Continued)

(52) U.S. Cl.
  CPC ............ *H04L 45/245* (2013.01); *H04L 45/16* (2013.01); *H04L 69/163* (2013.01); *H04L 45/24* (2013.01); *H04L 45/70* (2013.01); *H04L 47/41* (2013.01)

(58) Field of Classification Search
  CPC ...... H04L 45/245; H04L 45/16; H04L 69/163; H04L 45/70; H04L 45/24; H04L 47/41
  See application file for complete search history.

(56) References Cited

U.S. PATENT DOCUMENTS 9,264,353 B2 * 2/2016 Krishnaswamy ..... H04L 47/193
2005/0099983 A1 5/2005 Nakamura et al.
(Continued)

FOREIGN PATENT DOCUMENTS

CN 102843257 A 12/2012
CN 103580773 A 2/2014
(Continued)

OTHER PUBLICATIONS

Bonaventure et al., "Improving Multipath TCP Backup Subflows," MPTCP Working Group Internet—Draft, draft-bonaventure-mptcp-backup-00, Jul. 6, 2015, 11 pages.
(Continued)

*Primary Examiner* — Hieu T Hoang
(74) *Attorney, Agent, or Firm* — Fish & Richardson P.C.

(57) ABSTRACT

Based on this application, one or more parameters for a multipath connection in a redundant transmission mode that are used to represent path characteristics are measured in the redundant transmission mode, and the one or more parameters are compared with a parameter that is measured in a multipath transmission mode and that is used to represent a path characteristic of an aggregated path of the connection at this time.

16 Claims, 7 Drawing Sheets

S501
Measure, in a redundant transmission mode, path characteristics of a plurality of paths in the redundant transmission mode, where the redundant transmission mode is a transmission mode in which same data is transmitted on the plurality of paths; and measure, in a multipath transmission mode, a path characteristic of an aggregated path in the multipath transmission mode, where the multipath transmission mode is a transmission mode in which different data is transmitted on the plurality of paths, and the path characteristic of the aggregated path is a path characteristic of a single path when the plurality of paths are equivalent to the single path S502
When a path characteristic of a best single path is superior to the path characteristic of the aggregated path in the multipath transmission mode, transmit data of a connection by using the best single path, where the best single path is a path that has a best path characteristic measured in the redundant transmission mode and that is in the plurality of paths; and when the path characteristic of the aggregated path in the multipath transmission mode is superior to the path characteristic of the best single path, transmit the data of the connection by using the multipath transmission mode

(51) Int. Cl.
  *H04L 45/16* (2022.01)
  *H04L 69/163* (2022.01)
  *H04L 45/00* (2022.01)
  *H04L 47/41* (2022.01)

(56) References Cited

U.S. PATENT DOCUMENTS

| | | | |
|---|---|---|---|
| 2013/0077501 | A1 | 3/2013 | Krishnaswamy et al. |
| 2015/0281367 | A1* | 10/2015 | Nygren .............. H04L 65/1066 709/228 |
| 2016/0072702 | A1 | 3/2016 | Gao et al. |
| 2016/0212759 | A1 | 7/2016 | Schliwa-Bertling et al. |
| 2017/0187497 | A1* | 6/2017 | Walid ..................... H04L 1/188 |
| 2017/0302549 | A1* | 10/2017 | Han ....................... H04L 67/303 |
| 2018/0027097 | A1 | 1/2018 | Boucadair et al. |
| 2018/0184474 | A1 | 6/2018 | Skog |

FOREIGN PATENT DOCUMENTS

| | | |
|---|---|---|
| CN | 103905463 A | 7/2014 |
| CN | 104202243 A | 12/2014 |
| CN | 104994036 A | 10/2015 |
| CN | 105025524 A | 11/2015 |
| CN | 105474598 A | 4/2016 |
| CN | 105873096 A | 8/2016 |
| CN | 105915466 A | 8/2016 |
| CN | 106507696 A | 3/2017 |
| WO | 2016068759 A1 | 5/2016 |
| WO | 2016128644 A1 | 8/2016 |

OTHER PUBLICATIONS

PCT International Search Report and Written Opinion on International Application No. PCT/CN2018/112250 dated Jan. 30, 2019, 15 pages (with English translation).
Raiciu et al., "Coupled Congestion Control for Multipath Transport Protocols," IETF RFC 6356, Oct. 2011, 12 pages.
Wing et al,"Multipath TCP (MPTCP) Path Selection using PCP," MPTCP Internet—Draft, draft-wing-mptcp-pcp-00, Oct. 7, 2013, 10 pages.
Communication pursuant to Rule 164(1) EPC issued in European Application No. 18870460.5 dated Oct. 5, 2020, 9 pages.
Office Action issued in Chinese Application No. 201711094016.3 dated Nov. 3, 2020, 14 pages (with English translation).
Chen et al., "A measurement-based study of MultiPath TCP performance over wireless networks," Proceedings of the 2013 Conference on Internet Measurement Conference (IMC'13), Jan. 1, 2013, pp. 455-468, 14 pages.
Extended European Search Report issued in European Application No. 18870460.5 dated Dec. 18, 2020, 12 pages.
Nguyen et al., "An Enhancement of Multipath TCP Performance in Lossy Wireless Networks," 2016 IEEE 41st Conference on Local Computer Networks Workshops (LCN Workshops), Nov. 1, 2016, pp. 187-191, 6 pages.
Bagnulo, "Threat Analysis for TCP Extensions on Multi-path Operation with Multiple Addresses; Draft-ietf-mptcp-threat-08," Network Workimg Group, Jul. 30, 2011, 17 pages.
Fa et al., "Performance Analysis of MPTCP and CMT-SCTP Multi-path Transport Protocols," Computer Engineering and Applications, vol. 49, No. 21, Jun. 2013, 5 pages (With English Abstract).
Kaiping et al., "Survey of MPTCP-Based Multipath Transmission Optimization," Journal of Computer Research and Development, Issue 53, No. 11, Jun. 2015, 18 pages (with English abstract).
Office Action issued in Chinese Application No. 201711094016.3 dated Jan. 6, 2022, 8 pages.

* cited by examiner

DATA TRANSMISSION METHOD, APPARATUS, AND DEVICE

CROSS-REFERENCE TO RELATED APPLICATIONS

This application is a continuation of International Application No. PCT/CN2018/112250, filed on Oct. 27, 2018, which claims priority to Chinese Patent Application No. 201711094016.3, filed on Oct. 28, 2017. The disclosures of the aforementioned applications are hereby incorporated by reference in their entireties.

TECHNICAL FIELD

This application relates to the communications field, and in particular, to a data transmission method, apparatus, and device.

BACKGROUND

Since the Internet engineering task force (IETF) enacted the first multipath transmission control protocol (MPTCP) in January, 2013, researches on an MPTCP technology have involved aspects of framework formulation, security analysis, coupled congestion control (RFC6356), interface analysis, case discussion, middleware enabling, and the like. Currently, for the MPTCP technology, a throughput is increased through parallel transmission on a plurality of paths, for example, layout of a network segment by Samsung and Korea Telecom from a mobile phone to a MPTCP proxy gateway; or service continuity and reliability are implemented by using a plurality of paths, for example, a siri service of Apple Inc. MPTCP can support a multipath transmission mode, that is, data transmitted by a connection is transmitted on a plurality of subflows, and a subflow is referred to as a path. Actually, these subflows may use a same transmission protocol or different transmission protocols, such as TCP (Transmission Control Protocol), SCTP (Stream Control Transmission Protocol), or QUIC (Quick UDP Internet Connections). Therefore, a plurality of multipath transmission technologies may be derived from MPTCP, and may be collectively referred to as MP technologies. A connection including a plurality of paths is referred to as an MP connection. The plurality of paths may use different networks, such as a Wi-Fi network and a cellular network. The cellular network may be a 5G network, a 4G network, for example, a long term evolution (LTE) network, a 3G network, for example, a code division multiple access (CDMA) network, a 2G network, or the like.

However, for the MP connection, transmission performance obtained when data is transmitted by using a plurality of paths is lower than transmission performance obtained when data is transmitted by using a single path of a plurality of subflows. The transmission performance is, for example, a latency or a throughput (that is, a negative gain phenomenon). This is because path characteristics of the plurality of subflows are different. A parameter used to measure a path characteristic may be one or more of parameters such as a transmission rate, a round-trip time (RTT), a packet loss rate, a congestion window (CWND), and a bandwidth. The plurality of subflows may vary in the foregoing parameters. For example, an RTT of Wi-Fi is relatively stable, an RTT in LTE jitters greatly, and the RTT in LTE is usually far longer than the RTT of Wi-Fi. Therefore, in some cases, it is more suitable to transmit data by using one path in the connection.

In the prior art, to avoid the foregoing case, for example, before an MPTCP connection is established, a path characteristic is estimated by using PCP (Port Control Protocol) based on UDP (User Datagram Protocol), and whether to establish a new subflow by using the MPTCP technology is determined based on an estimated value used to represent a parameter of the path characteristic. However, there is an obvious difference between the path characteristic estimated by using PCP and a real path characteristic for a connection. In addition, such measurement can be performed only before the connection is established; and if such measurement is performed after the connection is established, a service is interrupted. A path characteristic in a network changes dynamically, and consequently, a measurement value cannot accurately reflect a real path characteristic of the connection. Therefore, a path selection requirement of selecting a low latency or suppressing a negative gain cannot be met, and transmission performance is poor.

SUMMARY

In view of this, embodiments of this application provide a data transmission method, apparatus, and device, to more accurately measure a path characteristic in a multipath transmission mode, thereby determining, as the path characteristic changes, one or more paths in a connection including a plurality of paths, and better ensuring transmission performance.

According to a first aspect, an embodiment of this application provides a data transmission method, where the method is applied to a connection including a plurality of paths, the paths are links between a sender and a receiver of the connection, and the method includes: measuring, in a redundant transmission mode, path characteristics of the plurality of paths in the redundant transmission mode, where the redundant transmission mode is a transmission mode in which same data is transmitted on the plurality of paths; measuring, in a multipath transmission mode, a path characteristic of an aggregated path in the multipath transmission mode, where the multipath transmission mode is a transmission mode in which different data is transmitted on the plurality of paths, and the path characteristic of the aggregated path is a path characteristic of a single path when the plurality of paths are made equivalent to the single path; when a path characteristic of a best single path is superior to the path characteristic of the aggregated path in the multipath transmission mode, transmitting data of the connection by using the best single path, where the best single path is a path that has a best path characteristic measured in the redundant transmission mode and that is in the plurality of paths; and when the path characteristic of the aggregated path in the multipath transmission mode is superior to the path characteristic of the best single path, transmitting the data of the connection by using the multipath transmission mode.

An order for performing measurement in the redundant transmission mode and the multipath transmission mode is not limited.

In a process of performing switching from the redundant transmission mode to the multipath transmission mode, or from the multipath transmission mode to the redundant transmission mode, there is always a subflow transmitting data, that is, actually, a measurement process is performed in a data transmission process, and both transmission path switching and transmission mode switching are performed in the data transmission process. Therefore, the connection is not broken, no service is interrupted, and use of a user is not affected. In addition, in this application, a parameter of a path characteristic is measured in the redundant transmission mode, and data transmission does not depend on the redundant transmission mode. In this way, load on devices of the receiver and the sender cannot be excessively heavy, and resources that are of the devices of the receiver and the sender and that are occupied to process data in the redundant transmission mode cannot be excessive, thereby effectively controlling impact of redundant data on the receiver and the sender. In addition, when measurement is performed in the redundant transmission mode, there is no need to specially construct an extra packet, and what is transmitted in the measurement process is also a data packet originally needing to be transmitted through the connection. Moreover, a transmission protocol used by a subflow of a connection in the redundant transmission mode and the multipath transmission mode does not change, and a measurement result better conforms to a path characteristic in an actual case. Compared with an existing technical means, a transmission path used based on such a measurement result can better ensure an improvement in transmission performance.

In an implementation, a path characteristic of the aggregated path in the redundant transmission mode may be further measured in the redundant transmission mode. In this way, the path characteristics of the aggregated path in the two transmission modes can be compared, to determine whether to use the multipath transmission mode.

In an implementation, a parameter used to represent the path characteristic is at least one of a latency, a bandwidth, a throughput, a packet loss rate, a packet loss range, or a congestion window value.

Which parameters are to be measured depends on transmission performance needing to be ensured. For example, if a high throughput is required for the connection, that is, more frequent use of the bandwidth is actually required for the connection, the throughput may be measured. In this way, the bandwidth can be estimated based on the throughput; or the congestion window value and the round-trip time are measured, and the bandwidth may be estimated through calculation; or the bandwidth is measured by sending a packet carrying special information. For another example, if a low latency is required for the connection, a parameter related to the latency, such as, an RTT, may be measured.

In an implementation, the method further includes: performing switching from the best single path or the multipath transmission mode to the redundant transmission mode; remeasuring the path characteristics of the plurality of paths in the redundant transmission mode; and transmitting the data of the connection in a better path characteristic manner between a best single path obtained through the remeasurement and the multipath transmission mode.

In an implementation, in a process of transmitting the data in the multipath transmission mode, the path characteristic of the aggregated path in the multipath transmission mode may be further remeasured, and the data is transmitted in a better path characteristic transmission manner between a best single path obtained through the remeasurement and the multipath transmission mode.

In an implementation, if the parameter representing the path characteristic is a throughput, a higher throughput indicates a better path characteristic, and the measuring, in a redundant transmission mode, path characteristics of the plurality of paths in the redundant transmission mode includes: measuring throughputs of the plurality of paths in a plurality of rounds within a period of time in the redundant transmission mode, to obtain multi-round measurement results; and using an average value of the multi-round measurement results of each of the plurality of paths as a throughput of the path measured during redundant transmission.

This is a scenario in which a negative gain is reduced. In this way, when none of a buffer size, a bandwidth, or a packet loss rate is known, the data can be transmitted in a higher throughput manner, thereby preventing an aggregated throughput of multipath transmission from being less than a throughput of the best single path, that is, avoiding a negative gain of multipath transmission. In addition, in this solution, path characteristic parameter measurement and path switching are performed in real time, and need to be improved only at a single end (that is, the sender).

There may be an interval of specified duration between two rounds (round) of tests. For example, the duration may be used in a congestion avoidance stage a period of time after the connection is established, for example, the duration may be specified as one second. Alternatively, an interval between the two rounds of tests may be a time from sending a data packet to receiving an ACK of the data packet, that is, an RTT of the data packet, for example, at an initial stage. Both the specified duration and a quantity of measurement rounds may be fixed or changed, for example, a random number distributed in a rule, a sequence changing in a rule, or an auto-learning result obtained according to an auto-learning algorithm. This is not limited in this application. Generally, a round of tests is measuring a value of a path characteristic parameter once.

A period of time may be preset, an average value of multi-round measurement values measured in the period of time is calculated, or a quantity of rounds used for obtaining an average value is preset. For another example, an average value may be calculated through weighted averaging, simple arithmetic averaging, or geometric averaging. This is not limited in this application. For still another example, the multi-round measurement values may be processed through machine learning or data fitting.

In an implementation, a timer for the multipath transmission mode and a timer for the redundant transmission mode are disposed on the sender, an indicator of updating a redundant measurement value and an indicator of updating a multipath measurement value are set on the sender, the indicator of updating a redundant measurement value is used to indicate whether the redundant transmission mode is used for measurement, the indicator of updating a multipath measurement value is used to indicate whether the multipath transmission mode is used for measurement, and the method further includes: resetting the timer for the multipath transmission mode when the timer for the multipath transmission mode expires; and resetting the timer for the redundant transmission mode when the timer for the redundant transmission mode expires.

In an implementation, the method further includes: setting the indicator of updating a multipath measurement value to 1 when the timer for the multipath transmission mode expires; setting the indicator of updating a redundant measurement value to 1 when the timer for the redundant transmission mode expires; after the path characteristic of the aggregated path in the multipath transmission mode is measured, setting the indicator of updating a multipath measurement value to 0 and resetting the timer for the multipath transmission mode; and after the path characteristics of the plurality of paths in the redundant transmission mode are measured, setting the indicator of updating a redundant measurement value to 0 and resetting the timer for the redundant transmission mode.

In an implementation, the measuring, in a redundant transmission mode, path characteristics of the plurality of paths in the redundant transmission mode includes: when the indicator of updating a redundant measurement value is set to 1, measuring the path characteristics of the plurality of paths in the redundant transmission mode; and the measuring, in a multipath transmission mode, a path characteristic of an aggregated path in the multipath transmission mode includes: when the indicator of updating a multipath measurement value is set to 1, measuring the path characteristic of the aggregated path in the multipath transmission mode.

In an implementation, the method further includes: before transmitting a data packet by using any path, checking the indicator of updating a redundant measurement value and the indicator of updating a multipath measurement value; and when the indicator of updating a redundant measurement value is set to 0 and the indicator of updating a multipath measurement value is set to 0, keeping transmitting data by using a current path.

In an implementation, the connection is an MPTCP connection, and the method further includes: transmitting the data in a slow start stage of the MPTCP connection by using the redundant transmission mode; measuring, in the redundant transmission mode, the path characteristic of the aggregated path in the redundant transmission mode in a plurality of rounds; and when it is determined a plurality of times that a rate of a change between a path characteristic measured in a round and a path characteristic measured in a previous round is less than a preset value, measuring the path characteristics of the plurality of paths in the redundant transmission mode.

In this way, measurement and path selection can be performed in a congestion avoidance stage of the connection, and performing redundant transmission in the slow start stage can also ensure transmission performance in the stage.

According to a second aspect, this application provides a data transmission method, where the method is applied to a connection including a plurality of paths, the paths are links between a sender and a receiver of the connection, and the method includes: measuring, in a redundant transmission mode, path characteristics of the plurality of paths in the redundant transmission mode, where the redundant transmission mode is a transmission mode in which same data is transmitted on the plurality of paths; and transmitting data of the connection by using one or more paths that are of the plurality of paths and that include the best single path, where the best single path is a path that has a best path characteristic measured in the redundant transmission mode and that is in the plurality of paths.

In this way, it can be convenient to find the best single path for data transmission, thereby ensuring transmission performance. For a specific beneficial effect, refer to the first aspect and this specification. The method for measuring a path characteristic in a redundant transmission mode in the second aspect is similar to that in the first aspect. Therefore, for descriptions and beneficial effects of the following implementations, refer to corresponding content in the first aspect. Details are not described herein again.

In an implementation, a parameter used to represent the path characteristic is at least one of a latency, a bandwidth, a throughput, a packet loss rate, a packet loss range, or a congestion window value.

In an implementation, the method further includes: performing switching from the one or more paths including the best single path to the redundant transmission mode; remeasuring the path characteristics of the plurality of paths in the redundant transmission mode; and transmitting the data of the connection by using one or more paths including a best single path obtained through the remeasurement.

Because a network status is time-varying, remeasurement is performed to refresh a measurement result, thereby adjusting a transmission path. This can better ensure transmission performance.

In an implementation, if the parameter representing the path characteristic is a throughput, a higher throughput indicates a better path characteristic, and the measuring, in a redundant transmission mode, path characteristics of the plurality of paths in the redundant transmission mode includes: measuring throughputs of the plurality of paths in a plurality of rounds within a period of time in the redundant transmission mode, to obtain multi-round measurement results; and using an average value of the multi-round measurement results of each of the plurality of paths as a throughput of the path measured during redundant transmission.

In an implementation, if the parameter representing the path characteristic is a latency, a lower latency indicates a better path characteristic, and the measuring, in a redundant transmission mode, path characteristics of the plurality of paths in the redundant transmission mode includes: measuring round-trip times of the plurality of paths in a plurality of rounds within a period of time in the redundant transmission mode, to obtain multi-round measurement results; and using an average value of the multi-round measurement results of each of the plurality of paths as a round-trip time of the path measured during redundant transmission.

According to a third aspect, this application describes a data transmission apparatus. The apparatus is configured to transmit data of a connection including a plurality of paths, the paths are links between a sender and a receiver of the connection, and the apparatus includes: a measurement module, where the measurement module is configured to measure, in a redundant transmission mode, path characteristics of the plurality of paths in the redundant transmission mode, the redundant transmission mode is a transmission mode in which same data is transmitted on the plurality of paths, the measurement module is further configured to measure, in a multipath transmission mode, a path characteristic of an aggregated path in the multipath transmission mode, the multipath transmission mode is a transmission mode in which different data is transmitted on the plurality of paths, and the path characteristic of the aggregated path is a path characteristic of a single path when the plurality of paths are made equivalent to the single path; and a transmission module, where the transmission module is configured to: when a path characteristic of a best single path is superior to the path characteristic of the aggregated path in the multipath transmission mode, transmit the data of the connection by using the best single path, the best single path is a path that has a best path characteristic measured in the redundant transmission mode and that is in the plurality of paths, and the transmission module is further configured to: when the path characteristic of the aggregated path in the multipath transmission mode is superior to the path characteristic of the best single path, transmit the data of the connection by using the multipath transmission mode.

According to a fourth aspect, this application describes a data transmission device, where the device is configured to transmit data of a connection including a plurality of paths, the device includes a processing circuit, a communications interface, and a storage medium, the storage medium stores a protocol stack program, the communications interface is configured to receive a data packet from another device and send a data packet to the another device by using an instruction in the storage medium, and the processing circuit is configured to run the instruction in the storage medium to control the communications interface, thereby implementing the method in any one of the first aspect or the implementations of the first aspect.

In an implementation, the device may be a terminal, a server, a transmission device in a network, or the like. The transmission device is, for example, a gateway router.

It should be understood that the third aspect and the fourth aspect describe the apparatus and the device that correspond to the first aspect. Therefore, for specific implementations, descriptions, and technical effects of the third aspect and the fourth aspect, refer to related paragraphs in the first aspect. Details are not described herein again.

According to a fifth aspect, this application describes a data transmission apparatus. The apparatus is configured to transmit data of a connection including a plurality of paths, the paths are links between a sender and a receiver of the connection, and the apparatus includes: a measurement module, where the measurement module is configured to measure, in a redundant transmission mode, path characteristics of the plurality of paths in the redundant transmission mode, and the redundant transmission mode is a transmission mode in which same data is transmitted on the plurality of paths; and a transmission module, where the transmission module is configured to transmit the data of the connection by using one or more paths that are of the plurality of paths and that include the best single path, and the best single path is a path that has a best path characteristic measured in the redundant transmission mode and that is in the plurality of paths.

According to a sixth aspect, this application describes a data transmission device. The device is configured to transmit data of a connection including a plurality of paths, and the device includes a processing circuit, a communications interface, and a storage medium, where the storage medium stores a protocol stack program, the communications interface is configured to receive a data packet from another device and send a data packet to the another device by using an instruction in the storage medium, and the processing circuit is configured to run the instruction in the storage medium to control the communications interface, thereby implementing the method in any one of the second aspect or the implementations of the second aspect.

In an implementation, the device may be a terminal, a server, a transmission device in a network, or the like. The transmission device is, for example, a gateway router.

It should be understood that the fifth aspect and the sixth aspect describe the apparatus and the device that correspond to the second aspect. Therefore, for specific implementations, descriptions, and technical effects of the fifth aspect and the sixth aspect, refer to related paragraphs in the second aspect. Details are not described herein again.

According to a seventh aspect, a computer program product is provided, where the computer program product stores program code used to implement the method in any one of the first aspect or the implementations of the first aspect, or program code used to implement the method in any one of the second aspect or the implementations of the second aspect.

According to an eighth aspect, a computer readable storage medium is provided, and includes an instruction. When the instruction runs on a computer, the computer is enabled to perform the method in any one of the first aspect or the implementations of the first aspect, or the method in any one of the second aspect or the implementations of the second aspect.

BRIEF DESCRIPTION OF DRAWINGS

To describe the technical solutions in the embodiments of this application more clearly, the following briefly describes the accompanying drawings required for the embodiments. Apparently, the accompanying drawings in the following descriptions show merely some embodiments of this application, and a person of ordinary skill in the art may derive other drawings from these accompanying drawings without creative efforts.

DESCRIPTION OF EMBODIMENTS

Figure 1:
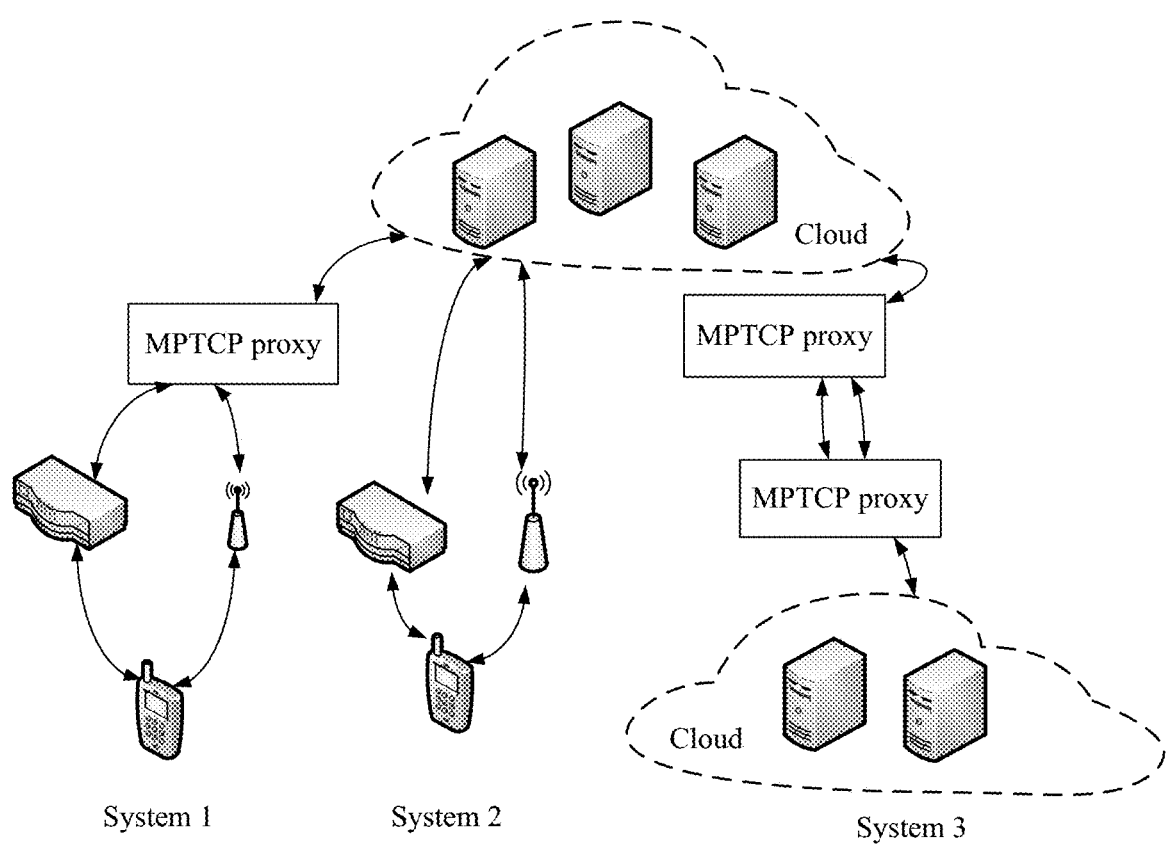
FIG. 1 shows three networking systems to which a method disclosed in embodiments of this application is applicable.

Embodiments of this application provide a data transmission method and apparatus of a terminal. The following clearly describes the technical solutions in the embodiments of this application with reference to the accompanying drawings in the embodiments of this application. Other embodiments obtained by a person of ordinary skill in the art based on the embodiments of this application without creative efforts shall fall within the protection scope of this application.

The following describes some terms used in this application.

Negative gain: The negative gain is a phenomenon that data of a connection is transmitted by using a plurality of subflows, and a throughput obtained after the plurality of subflows are aggregated is less than a throughput obtained by using only a subflow that has a highest single path throughput and that is in the plurality of subflows. The highest single path throughput is a highest throughput obtained when the data is transmitted by independently using one of the plurality of subflows in the connection.

A and/or B: A and/or B represents A and B, or A or B.

Host: The host is an end node configured to initiate or receive an MP connection, that is, a sender or a receiver of an MP connection. For example, the host may run on a terminal or a network device (for example, a server). For example, the host may alternatively be a virtual machine running on the terminal or the network device.

Path: The path is a link between a sender and a receiver. The path may be identified by using a four-tuple, and the four-tuple is used to represent a pair of a source address (and/or port) and a destination address (and/or port). It should be understood that both a receiver and a sender that support an MP technology may prepare a plurality of addresses on a host of the receiver and the sender, to identify a plurality of paths. In addition, a plurality of paths between a pair of a receiver and a sender may share one or more routers (router).

Subflow: The subflow is a flow that is of a TCP segment and that runs on a single path. The subflow is a part of an MP connection. Start and termination of the subflow are similar to those of a regular TCP connection. In this specification, one subflow corresponds to one path.

MP (multiple path) connection: The multipath connection is a group of subflows on which two hosts can communicate with each other over an application, and the group of subflows include a plurality of subflows. There is a one-to-one correspondence between sockets of the connection and sockets of the application. The MP connection is a connection whose data is transmitted by using a plurality of paths. Each path (that is, each subflow) may use different transmission protocols. For example, if a path uses a TCP protocol, the MP connection is an MPTCP connection. A link on which two hosts can communicate with each other over an application is also referred to as a connection. The MP connection includes a plurality of paths, while a common connection has only one path.

Packet: The packet is a package of data with a header, and the header may be logically complete or incomplete. Usually, the packet is obtained through physical packaging of data (physical packaging of data). Certainly, the packet may alternatively be obtained through logical packaging of data (logical packaging of data). The concept of the packet is used to describe data interaction between a host (host) and a network connected to the host.

ACK packet: The ACK packet is also referred to as an acknowledgement packet, an ACK (Acknowledgement), an ACK packet, a feedback packet, or a notification. The acknowledgement packet includes ACK information, for example, a sequence number of a data packet, and is usually a receiver to notify a sender that the data packet is received.

For related content of the host, the path, the link, and the subflow, refer to the document RFC 6824 of the IETF standard organization.

Congestion window: The congestion window is a largest quantity of data packets that can be sent at a time by a source end of data in a congestion control situation during TCP data transmission. It should be understood that the congestion window may be abbreviated as either cwnd or CWND. For example, in some code, cwnd is used to represent a congestion window.

RTT (Round-trip Time): The round-trip time represents a latency in a process from sending data by a sender to receiving, by the sender, reception acknowledgement information (for example, an ACK) that corresponds to the data and that is sent by a receiver. It should be understood that, in an implementation, the receiver sends the acknowledgement information corresponding to the data immediately after receiving the data. It should be understood that "immediately" includes a necessary processing time from receiving the data by the receiver to sending the acknowledgement by the receiver. It should be understood that the round-trip time may be abbreviated as either RTT or rtt. For example, in some code, rtt is used to represent a round-trip time.

Path characteristic: A parameter used to represent the path characteristic may be one or more of parameters such as a transmission rate, a round-trip time, a packet loss rate, a packet loss range, a congestion window, and a bandwidth. It may be considered that the path characteristic is used to describe a network status of a path.

In a current common multipath transmission mode scenario, there are usually two subflows, namely, a cellular network and a Wi-Fi network. However, it can be predicted that a transmission scenario in which there are more than two subflows becomes more popular. For example, there may be a plurality of operators in an area in a wide area network, and as a result, the area supports data transmission on more than two subflows. For another example, in a data center, multipath TCP data transmission on three or more subflows may be supported by using an equal-cost multipath routing (ECMP) technology.

The multipath transmission technology may be applied to a plurality of networking systems. Generally, if information needs to be transmitted by using the multipath transmission technology, at least one link between a sender and a receiver of the information supports the multipath transmission technology. FIG. 1 briefly shows three networking systems that can use the technology. For ease of description, FIG. 1 shows two paths in the multipath system as an example in which a Wi-Fi technology (represented by a router) and a cellular network (represented by a base station) are respectively used, where cloud servers are drawn at a cloud as an example. It should be understood that, the figure shows merely a connection between the cloud and another device as an example, and does not clearly indicate a connection between a specific server of the cloud and another device. In a system 1 in FIG. 1, a terminal communicates with the cloud. If a device that is at the cloud and that communicates with the terminal does not support the multipath transmission technology, but the terminal supports the technology, or if the device at the cloud supports the multipath transmission technology, but the terminal does not support the technology, when the technology needs to be used, one side that does not support the technology needs to interact, by using a proxy (proxy, for example, a gateway) that supports the multipath transmission technology, with the other side. In a system 2 in FIG. 1, both the cloud and a terminal support the multipath transmission technology. In a system 3 in FIG. 1, a scenario in which two clouds communicate with each other is described. Both the two clouds may support the multipath transmission technology, or at least one cloud may not support the technology, provided that the cloud that does not support the technology uses a proxy (for example, a gateway) that supports the multipath transmission technology. FIG. 1 shows a scenario in which both the two clouds use proxies that support the multipath transmission technology, so that gateways on the two sides communicate with each other by using the technology. A cloud may include a plurality of devices such as servers. Generally, a connection related to a cloud is communication between a device of the cloud and a peer end.

Actually, in different scenarios in which data is transmitted through a multipath transmission connection, different requirements are often posed on transmission performance, such as a low latency, a high throughput, or high reliability (that is, a low packet loss rate). For example, if a mobile phone downloads a file from a network hard disk through a multipath transmission connection that supports Wi-Fi and an LTE network, or transfers a large file from a cloud to another cloud through a multipath transmission connection, it is usually expected that the connection has a higher throughput. However, if real-time data transmission is performed through a multipath transmission connection, such as a voice or a conference call, it is expected that the connection has a low latency. If a video is watched or a game is played on a mobile phone on a video website especially a live video website through a multipath transmission connection, it is usually expected that the multipath transmission connection has a lower latency and a higher throughput.

The technical solutions described in this application are applied to a sender of data of a multipath transmission connection, that is, a generator of a multipath transmission packet in a connection. The sender may be located on an end device supporting the multipath transmission technology. If an end device at one end does not support multipath transmission, to transmit a packet by using the multipath transmission technology, it is necessary to use a proxy supporting the multipath transmission technology. In this case, the technical solutions in this application are applied to the proxy supporting multipath transmission. For details, refer to the networking forms in FIG. 1. Specifically, the technical solutions are applied to a cloud device supporting a multipath transmission protocol, for example, a server; a terminal supporting the multipath transmission protocol, such as a desktop computer, a notebook computer, a tablet computer, a cellular phone, a smartwatch, a smartphone, or a PDA; and a network element supporting the multipath transmission protocol, such as a gateway, an access router, a core router, a front router, or a load balancer.

Figure 2:
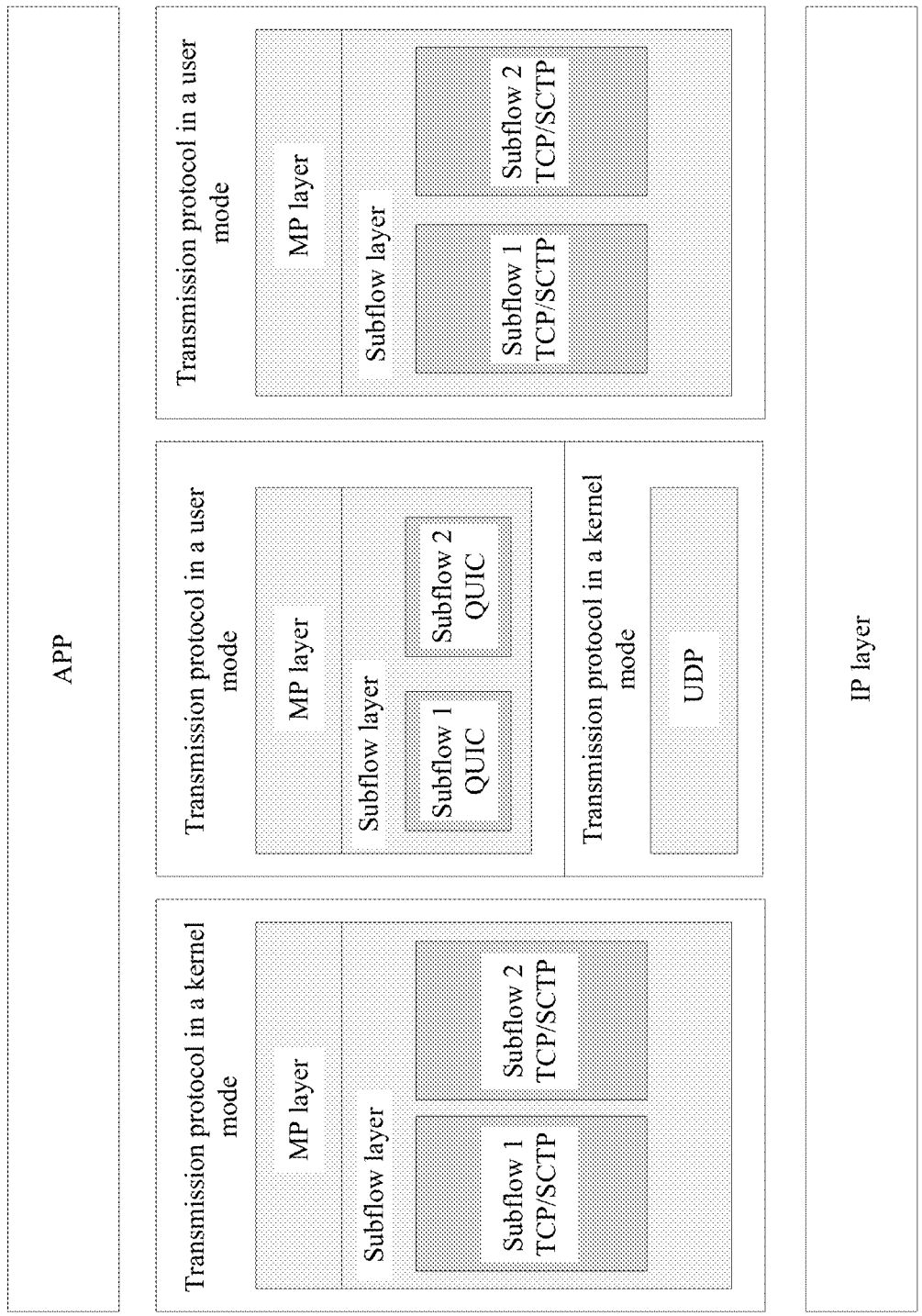
FIG. 2 is three possible schematic architectural diagrams of an MP layer and a subflow layer.

FIG. 2 briefly describes some commonly used architectures of various devices in this application in terms of a software architecture. The architecture includes an application (APP) layer, a multipath transport layer, and an IP layer. It may be considered that a currently relatively common TCP layer is replaced with the multipath transport layer, and the multipath transport layer is located between the IP layer and the APP layer at which applications are run. A part of the multipath transport layer runs in a user mode of an operating system, and another part runs in a kernel mode of the operating system. Because a subflow may use a plurality of transmission protocols, such as TCP, SCTP, and QUIC, the technical solutions of this application are implemented in software of a device, for example, may be implemented at an MP layer in a kernel mode or an MP layer in a user mode. Further, in some technical solutions of this application, a module that is configured to implement a redundant transmission mode and that is at the MP layer and a module that is configured to implement a multipath transmission mode and that is at the MP layer are used; and when code used to implement a method of this application runs, it may be considered that a new module is added to the MP layer. The new module may be configured to measure a path characteristic of a best path of the plurality of subflows in a redundant mode, to determine a proper transmission mode or transmission path to ensure transmission performance of a multipath transmission connection. FIG. 2 shows three implementations of a multipath transport layer. The solutions of this application may be implemented at an MP layer in the three implementations. Each implementation includes an MP layer and a subflow layer in a connection. A multipath transmission protocol runs at the MP layer, and two subflows are shown at the subflow layer. The foregoing device may include any one of the three multipath transport layers. In addition, the application layer is similar to the IP layer in the three implementations. Therefore, details are not described again. A multipath transport layer in a kernel mode is shown on the left side, and a subflow of the multipath transport layer uses the TCP/SCTP protocol. An MP layer in a user mode is shown in the middle, and a subflow of the MP layer uses the QUIC protocol and the UDP protocol is used for a kernel mode. A multipath transport layer in a user mode is shown on the right side, and a subflow of the multipath transport layer uses the TCP/SCTP protocol.

Figure 3:
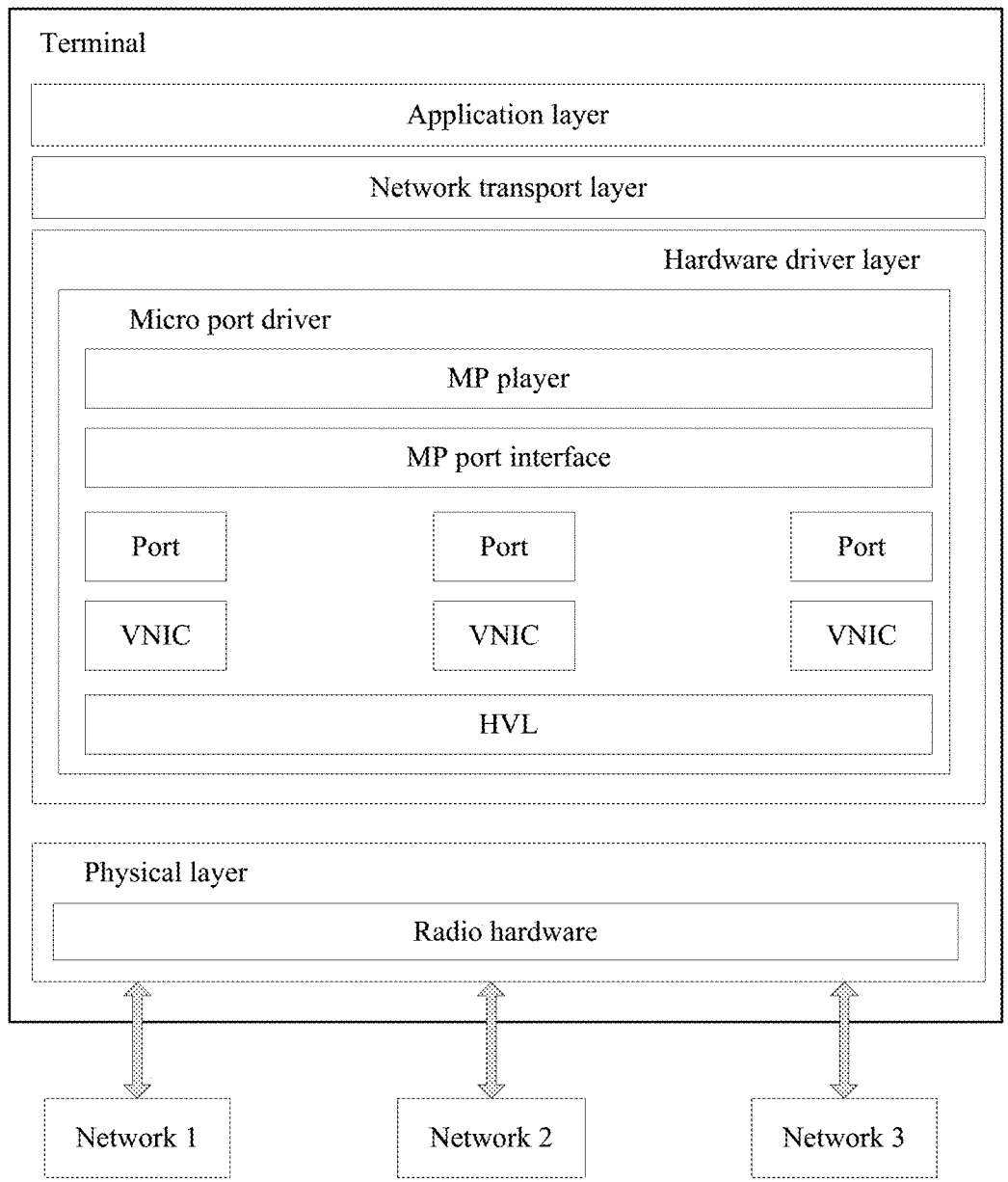
FIG. 3 is a schematic architectural diagram of a terminal supporting an MPTCP technology according to this application.

In FIG. 3, a terminal is used as an example, and an overall architectural diagram of a terminal supporting a multipath transmission technology in an embodiment of this application is described in detail. An example of architectural layers of software and hardware of the terminal is included based on a layer relationship of a logical architecture, and a component or a module configured to implement a virtual network interface card technology is also included. It should be noted that, a plurality of virtual network interface cards may be obtained based on one piece of radio hardware through virtualization by using the virtual network interface card technology, may be applied to network communications devices such as various terminal devices or gateways, and may be extended to any operating system. It should be understood that an architecture shown in FIG. 3, especially descriptions of a used transport layer, is also applicable to some network elements supporting the multipath transmission technology and a cloud device. The method described in this application may be stored in a memory in FIG. 3 in a form of code, and is implemented at the transport layer through invoking by a processor.

A physical layer includes one or more radio hardware devices, such as an antenna or another radio-frequency device. The one or more radio hardware devices are configured to complete communication at the physical layer, and the radio hardware device is a hardware foundation of implementing data transmission between terminals and a server through a plurality of radio networks. It should be noted that, these terminals may have two or more radio hardware devices. However, one of the two or more radio hardware devices may be preferentially selected through configuration to participate in communication and data transmission. The physical layer further includes other hardware devices such as the memory and the processor.

A hardware driver layer may, for example, use a Microsoft virtual network interface card technology, a micro port driver is installed, the driver includes an MP player and MP port interfaces, and the MP player is configured to control interaction between the driver and an operating system, and the MP port interfaces are configured to process communication between an MP layer and a plurality of ports. Each port corresponds to one virtual network interface card (Virtual Network Interface Card, VNIC). Each port may be associated with a corresponding radio network, and therefore, controls communication between the radio hardware and the network. Each port remains in a media access control (Media Access Control, MAC) status required for a connection between the terminal and a corresponding network. The MAC status is unique to each port. A VNIC provides all hardware layer services required by a port corresponding to the virtual network interface card. If a port corresponding to a VNIC is open, the VNIC is also open. The VNIC communicates with a hardware virtualization layer (HVL), and the layer multiplexes or demultiplexes a signal between each VNIC and physical radio hardware, so that the signal is allowed to be transmitted from the VNIC to the radio hardware, and the radio hardware is configured to perform radio communication between the port and the corresponding network. In conclusion, in the hardware driver layer shown in FIG. 3, the micro port driver may obtain a plurality of virtual network interface cards VNICs and a plurality of ports from one piece of radio hardware through virtualization, and different ports and VNICs may access different access nodes, so that the terminal may remain in connection to a plurality of access nodes synchronously. Certainly, in terms of hardware, a plurality of network interface cards may be configured on the terminal. It should be understood that, FIG. 3 shows merely an example of the hardware driver layer. Specific implementation of the hardware driver layer is not limited in this embodiment of this application.

The transport layer, that is, a part shown in FIG. 2 other than the APP layer, is used to run a transmission protocol, and maintains a connection established to a network-side server. The transport layer comprises a multipath transmission protocol.

An application layer, that is, the APP layer shown in FIG. 2, is used to control and coordinate a structure or module at another layer to complete a task and to implement a function, and includes application software and a client that are installed on the terminal, such as an address book, a clock, a YouTube client, or a Wechat (Wechat) client.

Data sent in this application is delivered from an application layer of a sender to a transport layer, and is allocated to each subflow by using a multipath transmission technology at the transport layer. A hardware driver layer of the sender sends the data to a network by using radio hardware at the physical layer. After the data is transmitted through the network, hardware of a peer end supporting the multipath transmission technology receives the data, and then reports the data to the transport layer. After the data is parsed and integrated at the transport layer, the data is reported to an application layer of the peer end, to complete data transmission.

Figure 4:
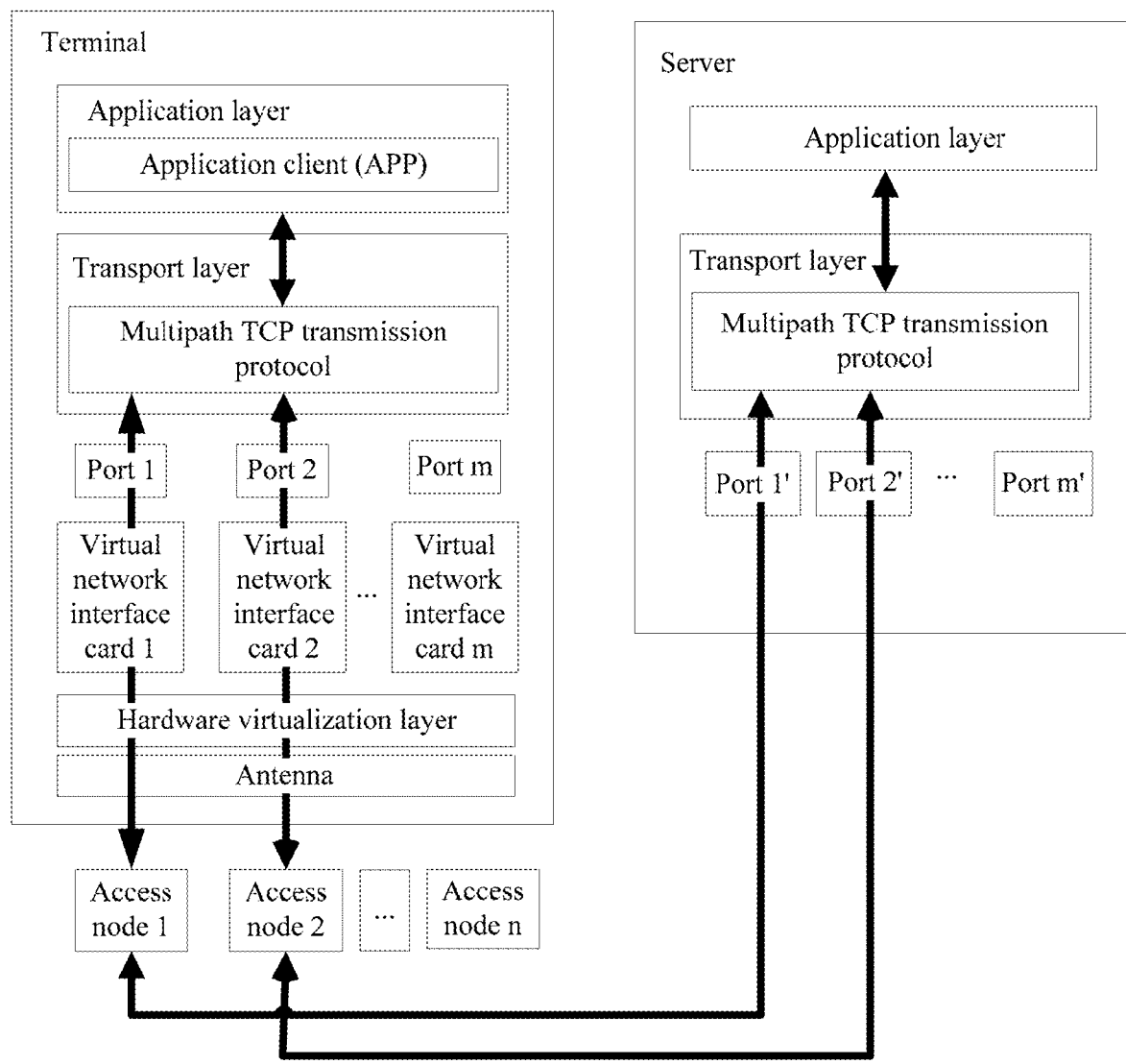
FIG. 4 is a schematic diagram of performing communication between a terminal and a server by using an MPTCP technology according to this application.

The following describes a process of establishing a multipath transmission connection by using an example in which a subflow uses a TCP protocol. A multipath transport layer may separately allocate data of a traditional TCP connection for transmission on different paths. "A plurality of paths" means "a plurality of TCP subflows". Once it is detected that a plurality of available network interface cards already access a network, according to a multipath transmission protocol, the data of the connection is split into a plurality of subflows, and the plurality of subflows are correspondingly allocated to the plurality of available network interface cards, to implement aggregation of a plurality of transmission links in a single connection. For example, as shown in FIG. 4, a multipath transmission connection is established between a client at an application layer of a terminal and an application layer of a server. A path from the application layer of the terminal to the application layer of the server through a port 1, an access node 1, and a server port 1' may be considered as a path 1. A path from the application layer of the terminal to the application layer of the server through a port 2, an access node 2, and a server port 2' may be considered as a path 2. The multipath transmission protocol is completely compatible with the TCP protocol, and management information of the multipath transmission connection is transmitted by using a TCP option field. Therefore, provided that both data interaction devices support the multipath transmission protocol, MP_CAP (Multipath Capable) options are exchanged during an initial connection. To be specific, the process of establishing the multipath transmission connection is similar to a process of establishing the TCP connection, and is a three-way handshake. A packet of the three-way handshake carries an MP_CAP option, and devices at a receiver and a sender exchange the MP_CAP option to indicate that both the devices support the multipath transmission protocol.

The multipath transmission technology is intended to improve transmission performance of a connection, for example, a throughput. Therefore, in terms of a design, it is required that an actual throughput in a multipath transmission mode cannot be less than a maximum throughput of transmission on a best single path. However, as described above, actually in many cases, transmission performance of transmitting data by using a single path by two communication parties supporting the multipath transmission technology is superior to that in the multipath transmission mode, for example, a negative gain. Apparently, this is a problem needing to be overcome. This is because the plurality of paths of the multipath transmission connection are usually heterogeneous. For example, the plurality of paths may include at least two of a digital subscriber line (DSL), Wi-Fi, a radio cellular network (for example, LTE), and a satellite link. Therefore, path characteristics of a plurality of paths of a multipath transmission connection are often different. A parameter used to represent a path characteristic may be a parameter such as a latency (for example, an RTT), a throughput, a packet loss rate (PLR), a packet loss range, a congestion window CWND value, or a bandwidth (BW). A larger difference between paths more easily leads to a negative gain problem. The negative gain problem even affects global deployment of the multipath transmission technology. For example, it is described in the standard [RFC 6182] that a recommended receiving buffer (buffer) is 2*sum(BW_i)*RTT_max, and it is further disclosed that only a quickest available path in a multipath transmission connection should be used in some scenarios, for example, the path 1 has a bandwidth of 100 Mb/s, and an RTT is 10 ms; and the path 2 has a bandwidth of 1 Mb/s, and an RTT is 1000 ms. However, a buffer of an intelligent device such as a smartphone, a notebook computer, or a personal computer is limited. A size of the buffer is also a reason for a negative gain. Therefore, the negative gain is easier to appear in the intelligent terminal device. However, sometimes, the size of the buffer is unknown at a protocol layer. According to the method described in this application, when to switch to the best single path for data transmission and when to use multipath transmission mode data can be learned by measuring the path characteristic during data transmission, thereby reducing the negative gain.

For the multipath transmission technology, data is transmitted on a plurality of paths, and the plurality of paths may be two or more paths. Data transmitted on the plurality of paths is usually different. As repeatedly described above, in the multipath transmission protocol, data of a connection is allocated to a plurality of subflows, and each of the plurality of subflows transmits a part of the data of the connection. For ease of description, in this application, such a transmission mode is referred to as a multipath transmission mode that is referred to as a multipath mode (MP mode) for short. However, in some special scenarios, for example, in a scenario in which a very high requirement is posed on data reliability, or in a scenario in which a relatively strict requirement is posed on a latency, another transmission mode may be used, namely, a redundant transmission mode that is also referred to as a redundant mode for short. The redundant transmission mode is transmitting same data on all subflows of a multipath transmission connection, in other words, data of a connection is repeatedly transmitted by using a plurality of subflows. Apparently, advantages of the multipath transmission technology cannot be used in such a transmission mode, and devices of a sender and a receiver of the data need to provide a higher hardware configuration to process at least one piece of redundant data. Consequently, higher device configuration costs are caused. In addition, it should be noted that for a multipath transmission connection, data can be transmitted on n paths, and n is greater than 1. In a default multipath transmission mode, the data is transmitted by using the n paths. However, the data can be transmitted by using one or more of the n paths.

According to this application, one or more parameters for the multipath transmission connection in this case that are used to represent path characteristics are measured in the redundant transmission mode, and the one or more parameters are compared with a path characteristic that is measured in the multipath transmission mode and that is of an aggregated path of the connection at this time. In this way, data can be transmitted in a better path characteristic manner (a single path or a plurality of paths), to obtain better transmission performance. A path characteristic of an aggregated path is a path characteristic of a single path when a plurality of subflows of a multipath transmission connection are made equivalent to the single path. Alternatively, the path characteristics of the plurality of subflows of the multipath transmission connection are measured in the redundant transmission mode, to select one or more of the plurality of subflows for data transmission. In this way, performance in the multipath transmission mode can be better used. In addition, in a process of performing switching from the redundant transmission mode to the multipath transmission mode, or from the multipath transmission mode to the redundant transmission mode, there is always a subflow transmitting data, that is, actually, a measurement process is performed in a data transmission process, and both transmission path switching and transmission mode switching are performed in the data transmission process. Therefore, the connection is not broken, no service is interrupted, and use of a user is not affected. In addition, in this application, a parameter of a path characteristic is measured in the redundant transmission mode, and data transmission does not depend on the redundant transmission mode. In this way, load on devices of the receiver and the sender cannot be excessively heavy, and resources that are of the devices of the receiver and the sender and that are occupied to process data in the redundant transmission mode cannot be excessive, thereby effectively controlling impact of redundant data on the receiver and the sender. In addition, when measurement is performed in the redundant transmission mode, there is no need to specially construct an extra packet, and what is transmitted in the measurement process is also a data packet originally needing to be transmitted through the connection. Moreover, a transmission protocol used by a subflow of a connection in the redundant transmission mode and the multipath transmission mode does not change, and a measurement result better conforms to a path characteristic in an actual case. Compared with an existing technical means, a transmission path used based on such a measurement result can better ensure an improvement in transmission performance. Measuring a parameter that represents a specific path characteristic depends on a requirement of a service of the connection on transmission performance. Examples of a high throughput (that is, a reduced negative gain) and a low latency are separately used below for description.

In this application, a measurement process is performed in the data transmission process in a phased manner. To be specific, one or a plurality of transmission subflows are selected through measurement, and then the one or plurality of selected subflows are used for the multipath transmission mode. Measurement may be started in either the redundant transmission mode or the multipath transmission mode. In addition, a network status is changeable. Therefore, to ensure better transmission performance of the connection within a period of time of data transmission, the connection in the multipath transmission mode may be triggered by using an event or periodically to use the redundant transmission mode, to determine whether a transmission path needs to be adjusted for the connection. This is an advantage of the solutions described in this application. Measurement can be repeatedly performed, measurement accuracy can be improved, and no service is interrupted. The measurement process is self-adapted to a dynamic network environment (self-adapted to a dynamic network environment). For example, the event may be that some path characteristics of the aggregated path are less than a threshold or go beyond a threshold range, or a specified timer expires, or pages of some services cannot be displayed, or a video stalls, or a preset time expires, for example, a time that is between 8:00 a.m. and 8:10 a.m. (Beijing time) and whose seconds can be exactly divided by 15. Neither duration setting of a period nor a type of the event used to trigger measurement is limited in this application. For ease of description, a process of measurement at a time in a transmission mode is described in each of the following embodiments.

Because of bandwidth waste, it is generally considered that the redundant transmission mode hinders aggregation for the multipath transmission connection. In addition, even though the redundant transmission mode facilitates a reduction in a data latency (for example, an RTT), high costs are caused. Therefore, the redundant transmission mode is not used to improve link transmission performance. However, in this application, a value, measured in the redundant transmission mode, of a parameter that is used to represent a path characteristic and that is for the multipath transmission connection is used to represent a value of a parameter corresponding to a best single path of the multipath transmission connection. In addition, a value, measured in the redundant transmission mode, of a parameter that is used to represent a path characteristic and that is of each subflow of the multipath transmission connection can better reflect an advantage or a disadvantage of the path characteristic of each subflow, so that some subflows with relatively good path characteristics are used for data transmission. In this way, in the technical solution of this application, a path characteristic of the best single path can be tactfully measured in the redundant transmission mode in a transmission process. Therefore, the path characteristic of the best single path may be compared with the path characteristic of the aggregated path in the multipath transmission mode based on a requirement, to transmit data by using the plurality of subflows or the best single path. It may be even determined that which subflows of the plurality of subflows may be used for data transmission. Measurement timeliness and accuracy are both superior to those in an existing solution, and a subflow that can ensure better transmission performance can be better selected. For a negative gain scenario, the following technical effects are obtained: When none of a buffer size, a bandwidth, or a packet loss rate is known, the data can be transmitted in a higher throughput manner, thereby preventing an aggregated throughput of multipath transmission from being less than a throughput of the best single path, that is, avoiding a negative gain of multipath transmission. In this solution, path characteristic parameter measurement and path switching are performed in real time, and need to be improved only at a single end (that is, the sender).

In the following embodiments, a measured parameter used to represent a path characteristic may be at least one of the following parameters: a latency (for example, an RTT), a throughput (throughput), a packet loss rate (Packet Loss Rate, PLR), a packet loss range, a congestion window CWND value, a bandwidth, and the like. Which parameters are to be measured depends on transmission performance needing to be ensured. For example, if a high throughput is required for the connection, that is, more frequent use of the bandwidth is actually required for the connection, the throughput may be measured. In this way, the bandwidth can be estimated based on the throughput; or the congestion window value and the round-trip time are measured, and the bandwidth may be estimated through calculation; or the bandwidth is measured by sending a packet carrying special information. For another example, if a low latency is required for the connection, a parameter related to the latency, such as, an RTT, may be measured. For ease of description, a parameter that is measured in an implementation and that is used to represent a path characteristic is referred to as a path characteristic parameter below for short.

As described above, the redundant transmission mode may be triggered for measurement by using an event or periodically. In this case, measurement may be started periodically or aperiodically at an initial stage, namely, a connection establishment stage. In this way, there is no need to independently set an occasion on which measurement is started, and a data transmission link can be more quickly adjusted, so that the transmission performance is more quickly optimized. For one connection, path characteristic parameter values at the initial stage (that is, the connection establishment stage, which is also referred to as a slow start stage) and a congestion avoidance stage that is a period of time after the connection is established change greatly, and these parameter values at the initial stage greatly fluctuate. This does not reflect values in the congestion avoidance stage. For example, a CWND value of the connection at the initial stage exponentially increases, while a CWND value of the connection in the congestion avoidance stage relatively stably keeps in a range. When the manner described in this application is used for measurement, it needs to be ensured to a greatest extent that measurement data can relatively objectively reflect a network status of a path. Therefore, in a process of measuring a parameter value in the redundant transmission mode or the multipath transmission mode, validity of a measurement value may be improved in the following manner, that is, it is ensured that the measurement value is a value of the connection in the congestion avoidance stage. Certainly, for the measurement at a time, a validity improvement process is optional. For example, in a stage in which data of the connection is stably transmitted, this process may be unnecessary.

In an implementation, in the process of measurement at a time, path characteristic parameters are measured in a plurality of rounds (round). If a change in the path characteristic parameter values measured in the plurality of rounds is less than a given threshold, it is considered that path characteristic parameter values measured in a current network status are valid, and these measurement values can be used, or measurement is continued for one or more rounds. For example, the change may be indicated by using a variance, or may be indicated by using a change rate obtained based on path parameter values measured in two rounds or a difference between path parameter values measured in two rounds. A specific manner is not limited in this application. For example, the threshold h is defined, and h□(0, 1), for example, h=0.2. After Nr rounds of tests, if a change rate of measurement results (for example, a throughput of a path) obtained in the Nr (Nr>1) rounds of tests is always less than h, it can be considered that the measurement results are valid. For example, a valid measurement value may be a measurement result obtained in the last round, or may be an average value of measurement results obtained in some of the Nr rounds of tests.

A process of measurement at a time is a process in which measurement and processing are performed in a transmission mode to finally obtain one or a group of target parameters used to select a transmission path this time. For example, a path characteristic parameter of the aggregated path is measured in the multipath transmission mode, then switching to the redundant transmission mode is performed for measurement, and a transmission path is adjusted to one or more paths based on path characteristic parameters measured in the multipath transmission mode and the redundant transmission mode. It may be considered that the process of measurement at a time is performed in each of the multipath transmission mode and the redundant transmission mode in this process.

There may be an interval of specified duration between two rounds (round) of tests. For example, the duration may be used in a congestion avoidance stage a period of time after the connection is established, for example, the duration may be specified as one second. Alternatively, an interval between the two rounds of tests may be a time from sending a data packet to receiving an ACK of the data packet, that is, an RTT of the data packet, for example, at an initial stage. Both the specified duration and a quantity of measurement rounds may be fixed or changed, for example, a random number distributed in a rule, a sequence changing in a rule, or an auto-learning result obtained according to an auto-learning algorithm. This is not limited in this application. Generally, a round of tests is measuring a value of a path characteristic parameter once.

In an implementation, once a value of the process of measurement at a time is obtained, a time interval between the process of measurement at this time and a process of measurement at a next time may be timed by using a timer. An indicator (indicator) may be further defined. It is indicated, by updating a value of the indicator, that a process of measurement at a next time is to be performed.

For another example, to reduce a system error of a measurement value of a path characteristic parameter, the measurement value may be processed to obtain a parameter value used for comparison. For example, an average value of multi-round measurement values may be calculated. A period of time may be preset, an average value of multi-round measurement values measured in the period of time is calculated; or a quantity of rounds used for obtaining the average value is preset. For another example, an average value may be calculated through weighted averaging, simple arithmetic averaging, or geometric averaging. This is not limited in this application. For still another example, the multi-round measurement values may be processed through machine learning or data fitting.

Certainly, the processing may also be considered as a method for obtaining a valid measurement value. The foregoing manners are only some examples. A method for improving stability of a measurement value is not limited in this application. Alternatively, the processing may be performed after it is determined that the valid measurement value is obtained. To be specific, after it is determined the multi-round measurement values are valid, a plurality of rounds of values are measured to further improve accuracy of the measurement values. The processing is also optional.

When the connection is initially established, the redundant transmission mode or the multipath transmission mode may be used by default. In this way, measurement may be started from a default transmission mode. This is more convenient. In addition, in the multipath transmission mode, a data packet is allocated by using an existing scheduling scheme. For example, the scheduling scheme may be round-robin scheduling. A minimum round-trip time (min RTT) algorithm may also be a user-defined algorithm. This is not limited in this application. The following describes an implementation procedure in such a scenario in which the redundant transmission mode is used to determine a best path for single path transmission, or in which the multipath transmission mode is used. In the implementation, an example in which the default transmission mode is the redundant transmission mode is used for description. The redundant transmission mode is initially used by default, thereby ensuring transmission performance in a slow start stage (slow start stage). In addition, after a proper path is subsequently selected through measurement, data transmission does not depend on the redundant transmission mode. Therefore, load on a device and a network cannot be excessive. In the redundant transmission mode, a throughput may be represented by a result obtained by dividing a total amount of data sent in a round by duration of the round.

A sender measures, in the redundant transmission mode, at least one path characteristic parameter of a plurality of subflows of the multipath transmission connection in the redundant transmission mode. In this way, a best single path may be determined by comparing measurement results or calculation results. The calculation results are obtained through calculation based on the measurement results, such as a shortest RTT, a widest bandwidth, or a highest throughput. This depends on which transmission performance needs to be ensured. Each path characteristic parameter may be measured only once, or may be ensured in any one of the foregoing manners.

In an implementation, at least one path characteristic parameter of the aggregated path of the multipath transmission connection may be further measured, and is used as at least one path characteristic parameter of the best single path of the multipath transmission connection.

Certainly, the sender may store the path characteristic parameter and the best single path that are determined through measurement this time.

Figure 5:
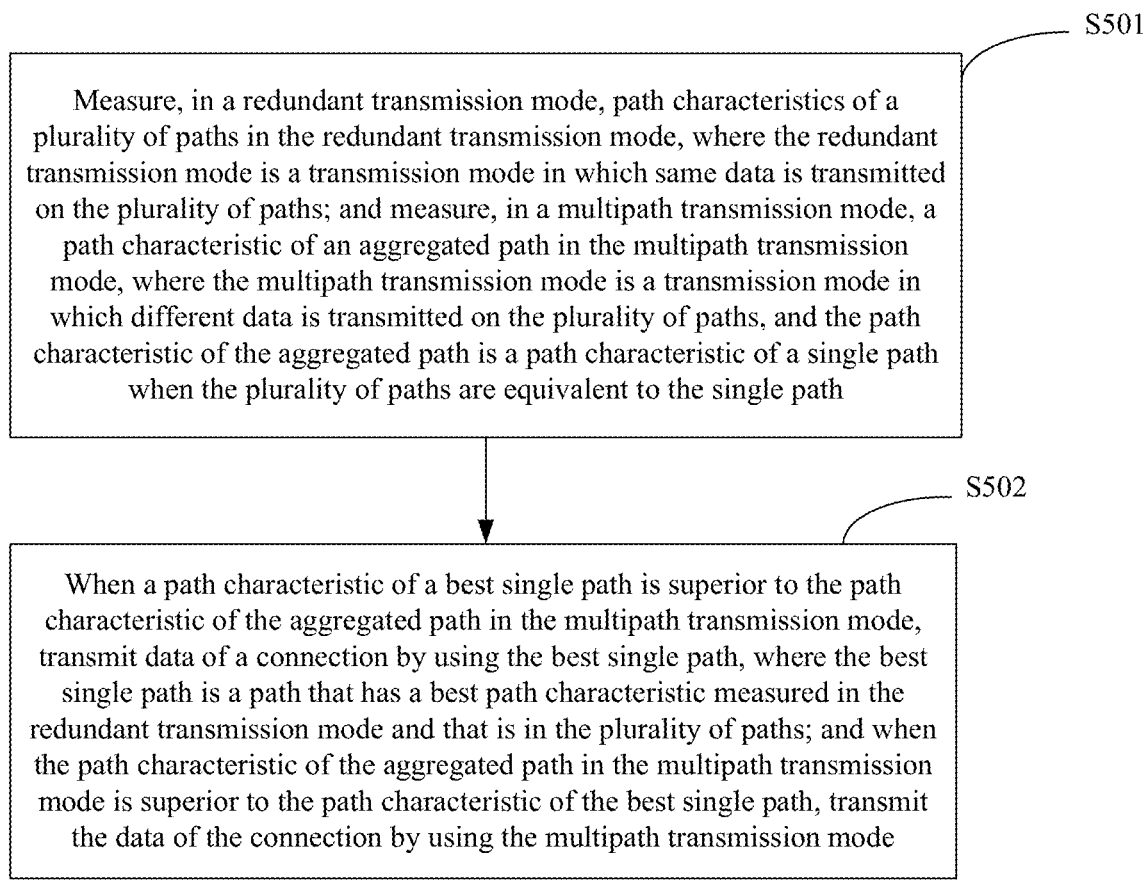
FIG. 5 is a flowchart of a data transmission method according to this application.

The foregoing descriptions are applicable to a flowchart of a data transmission method shown in FIG. 5. S501 and S502 in the flowchart summarize an implementation procedure. For explanations and descriptions of the method corresponding to FIG. 5, refer to the first aspect and the implementations of the first aspect of the summary. The following descriptions may be considered as specific implementations conforming to a procedure corresponding to FIG. 5.

It is determined whether path characteristic parameters of the aggregated path in the multipath transmission mode need to be measured. For example, it is detected whether the path characteristic parameters that are of the aggregated path in the multipath transmission mode and that are stored by the sender expires, or it is determined whether a condition for triggering measurement of the path characteristic parameters is met. If the path characteristic parameters need to be measured, switching to the multipath transmission mode is performed to measure at least one path characteristic parameter of the aggregated path of the multipath transmission connection. Each path characteristic parameter may be measured only once, or validity of a measurement value may be ensured in any one of the foregoing manners. In addition, it may be determined again whether the path characteristic parameter of the best single path stored by the sender expires. If the path characteristic parameter expires, the redundant transmission mode is entered for measurement. Data is transmitted by using the best single path and a path with good transmission performance in the multipath transmission mode. The transmission performance may be a latency, a bandwidth, or a throughput. This depends on a requirement of a service carried on a link. The transmission performance is represented by a measured path characteristic parameter or a calculation result obtained based on a measurement value. In this way, it may be ensured that path characteristic parameters measured in different transmission modes can be updated in real time, to ensure that a data transmission path can maintain relatively good transmission performance.

If the path characteristic parameters do not need to be measured, that is, if the path characteristic parameters of the aggregated path in the multipath transmission mode that are stored by the sender do not need to be updated, directly switching from the redundant transmission mode to best single path transmission and the multipath transmission mode may be performed, and a mode that is of best single path transmission and the multipath transmission mode and that has a better transmission performance indicated by measurement results is used to transmit data. After a period of time or event triggering, the foregoing process may be repeated by using the redundant transmission mode again. Certainly, if a switched-to mode is the multipath transmission mode, after a period of time or specific event triggering, the path characteristic parameter of the aggregated path in the multipath transmission mode may alternatively be first obtained, and then a path characteristic parameter in the redundant transmission mode is updated by using the redundant transmission mode, switching to best single path transmission and the multipath transmission mode is performed based on a new measurement result, and a mode that is of best single path transmission and the multipath transmission mode and that has a better transmission performance indicated by the measurement result is used to transmit data. Certainly, after the path characteristic parameter of the aggregated path in the multipath transmission mode is obtained, it can be determined whether the path characteristic parameter of the best single path of the path needs to be updated. If the path characteristic parameter of the best single path needs to be updated, new data is measured in the redundant transmission mode. If the path characteristic parameter of the best single path does not need to be updated, data that is previously measured in the redundant transmission mode and that is stored in the terminal may be used.

The foregoing implementation describes measurement of the path characteristic parameters of the aggregated path in both the redundant transmission mode and the multipath transmission mode. It may be considered that the implementation corresponds to FIG. 5.

Certainly, measurement may alternatively be performed only in the redundant transmission mode to determine a path. Performing measurement only in the redundant transmission mode can be used to determine the best single path of the multipath transmission connection. In this case, measuring the path characteristic of the aggregated path in the redundant transmission mode is optional. This is the second aspect of the summary, and corresponds to claims 10 to 14. The foregoing descriptions are still applicable. For example, it is expected that the data of the multipath transmission connection is always transmitted by using the best single path in the subflows, or it is expected that the data of the multipath transmission connection is transmitted by using a plurality of subflows that have relatively good path characteristics and that are of the subflows, or it is expected that one or more subflows having relatively good path characteristics are selected from some subflows of the multipath transmission connection.

A corresponding procedure may be as follows: A multipath transmission connection is enabled to enter the redundant transmission mode, and one or more path characteristic parameters of each subflow are measured in the redundant transmission mode. Optionally, validity of the obtained path characteristic parameter may be ensured by using the foregoing method. Data is transmitted by using a best single path or a plurality of relatively good subflows, and the best single path or the plurality of relatively good subflows are obtained based on the measured path characteristic parameters of the plurality of subflows. A quantity of the relatively good subflows may be preset. For example, a best subflow may have a lowest latency, a widest bandwidth, a highest throughput, or the like. Therefore, correspondingly, the plurality of relatively good subflows are, for example, two subflows that have a relatively low latency and that are of four subflows of a multipath transmission connection. The measured path characteristic parameters may be compared, to select a best subflow. Alternatively, calculation may be performed based on the measured path characteristic parameters, and a best subflow is selected based on a calculation result. In addition, the redundant transmission mode may be entered periodically or through event triggering. The foregoing process is repeated to update a measurement result, and the data is transmitted by using the best single path or the plurality of relatively good subflows determined based on an updated measurement result. Consequently, the updated measurement result may cause a data transmission path to change, or an original path may be maintained. In this way, the data transmission path may be updated in real time, to better adapt to a change in a network status, and better ensure transmission performance. For explanations and implementation of descriptions similar to those in the procedure in which measurement is performed in both the redundant transmission mode and the multipath transmission mode, refer to the foregoing.

For ease of understanding, an example in which a negative gain in a multipath transmission mode needs to be reduced is used below to describe a specific implementation of transmitting data by using a path with relatively good transmission performance by using the foregoing measurement method. The specific implementation may be considered as a specific implementation of a procedure of the method corresponding to FIG. 5. In the process, the concerned transmission performance is a throughput, and good transmission performance is manifested in a high throughput. Specifically, a throughput of a path within one second is used for comparison. In the implementation, improvement is performed at an MP (Multiple Path) layer in a kernel mode, to drive an existing redundant transmission module and an existing multipath transmission module to implement network measurement, a throughput of a best single path and a throughput of an aggregated path are obtained based on a measurement result, to determine the best single path. The best single path is a path having a highest throughput. Data is transmitted in a relatively high throughput manner, to avoid generation of a negative gain in real time. In the implementation, a path uses a TCP protocol or an SCTP protocol. For a noun or step that is used in the implementation and that is the same as the foregoing noun or step, refer to the foregoing descriptions. Details are not described herein again. For example, a data transmission apparatus 600 shown in FIG. 6 may be actually understood as a transport layer of a corresponding device, and the transport layer is specifically an MP layer. In this application, it may be considered that an improvement in a negative gain reduction scenario is performed by a negative gain avoidance module 601. The negative gain avoidance module 601 performs network measurement and switches a transmission path by driving an existing redundant transmission module 602 and an existing multipath transmission module 603, that is, performs the methods in the summary and the specific implementations of this application.

At an initial stage of establishing the multipath transmission connection, the MP layer in a kernel mode sends a packet in a redundant manner, and a throughput of an aggregated path is calculated once after a round of transmission. The throughput of the aggregated path is equal to a result obtained by dividing, by a time spent in a round, an amount of data successfully sent at the MP layer in the round. If a measurement value of the throughput this time is greater than a previous measurement value a % (for example, a=20) of the throughput, the redundant transmission mode continues to be maintained, and a throughput measurement counter is set to 0; if a measurement value of the throughput this time is not greater than a previous measurement value a % (for example, a=20) of the throughput, the redundant transmission mode is maintained, and a throughput measurement counter is increased by 1. A round of transmission represents a process from sending a data packet to receiving an ACK of the data packet.

After a value of the throughput measurement counter is equal to 3 (the value may be changed), the MP layer measures the throughput in a redundant mode. If an expiration time of a throughput measurement timer A is initialized into 10 seconds, a throughput measurement indicator A is set to 1. If an expiration time of a throughput measurement timer B is initialized into 10 seconds, a throughput measurement indicator B is set to 1. In this way, an unstable initial stage of a connection is skipped. Each path characteristic of the connection at this stage changes greatly, and an amount of transmitted data is small. It is merely required to maintain an initial default path for transmission.

The throughput measurement counter is a counter, and through the foregoing setting, the counter may be configured to indicate whether the multipath transmission connection is at the initial stage of establishing the connection or the congestion avoidance stage (congestion avoidance stage) of the connection. In the foregoing setting, it may be considered that the connection is in the congestion avoidance stage after the value of the throughput measurement counter is equal to 3. The throughput measurement timer A (also referred to as a timer for a redundant mode, the timer for a redundant mode) and the throughput measurement timer B (also referred to as a timer for a multipath mode, the timer for an MP mode) are two timers. For example, after the throughput measurement timer expires each time, an expiration time needs to be reset. The throughput measurement timer A may be configured to trigger measurement in the redundant transmission mode, and the throughput measurement timer B may be configured to trigger measurement in multipath transmission. The throughput measurement indicator A is also referred to as an indicator of updating a redundant measurement value (indicator of updating redundant measurement value), and is referred to as a redundant indicator for short, and is used to indicate whether to use the redundant transmission mode for measurement. The throughput measurement indicator B is also referred to as an indicator of updating a multipath measurement value (the indicator of updating MP measurement value), is referred to as a multipath indicator (indicator of MP), and is used to indicate whether to use the multipath transmission mode for measurement. When the redundant indicator and the multipath indicator are set to 1, measurement needs to be performed. When the redundant indicator and the multipath indicator are set to 0, measurement does not need to be performed, that is, a previous measurement value stored by the sender may be used. Certainly, the redundant indicator and the multipath indicator may be reversely set. It should be understood that after remeasurement, the previous measurement value in a corresponding transmission mode that is stored by the sender is updated. In the implementation, two types of logic: whether remeasurement needs to be performed (the throughput measurement indicator) and a measurement interval (the throughput measurement timer) are separately implemented. In this way, it is relatively easy to change a time interval between measurement. Only an expiration time of the timer needs to be changed, and other logic in the process is not affected. Certainly, in another implementation, the foregoing two types of logic may be integrated. This is not limited in this application. It should be understood that an expiration time of each timer in the foregoing logic may be manually specified, and expiration times of the two timers may be set to different values.

Throughputs of the plurality of paths are measured in the redundant transmission mode. In this way, a best single path may be obtained by comparing the measured throughputs of the plurality of paths. Certainly, optionally, a throughput of the aggregated path may be measured in the redundant mode, and it may be obtained that the throughput of the aggregated path in the redundant mode is closest to a throughput of the best single path. Optionally, the measurement process may include the foregoing process of obtaining a valid measurement value, for example, specifically includes: measuring the throughputs of the plurality of paths in a plurality of rounds within a period of time (for example, within one second), to obtain multi-round measurement results; and using an average value of the multi-round measurement results of each of the plurality of paths as a throughput of the path measured during redundant transmission. After the measurement value this time is obtained, the expiration time of the throughput measurement timer A is set to 10 seconds, and the throughput measurement indicator A is set to 0. After the measurement ends, each time data is sent, it is checked whether the throughput measurement indicator B is 1. If the throughput measurement indicator B is 1, switching to the multipath transmission mode is performed to measure the throughput of the aggregated path, and data is transmitted in a manner that has a higher throughput and that is one of the best single path and the aggregated path in the multipath transmission mode, where the throughput of the aggregated path in the multipath transmission mode is represented by measured data obtained after switching. For example, the foregoing two throughputs may be compared to determine whether the best single path or the aggregated path in the multipath transmission mode is used. If the throughput measurement indicator B is 0, data is transmitted in a manner that has a higher throughput and that is one of the best single path and the aggregated path in the multipath transmission mode. For example, the throughput of the aggregated path in the multipath transmission mode is represented by data that is measured last time and that is stored by the sender.

Measuring the throughput of the aggregated path in the multipath transmission mode specifically includes using data in the multipath transmission mode, measuring an average throughput of the aggregated path within one second, and using the average throughput as a throughput estimation value. Optionally, the measurement process may include the foregoing process of obtaining a valid measurement value. For example, the measurement process specifically includes: measuring the throughput of the aggregated path in a plurality of rounds within a period of time (for example, within one second), to obtain multi-round measurement results; and using an average value of the multi-round measurement results as the throughput of the aggregated path measured in the multipath transmission mode. After the measurement value this time is obtained, the expiration time of the throughput measurement timer B is set to 10 seconds, and the throughput measurement indicator B is set to 0. After the measurement ends, each time data is sent, it is checked whether the throughput measurement indicator A is 1. If the throughput measurement indicator A is 1, switching to the redundant transmission mode is performed to measure the throughput of the best single path, and data is transmitted in a manner that has a higher throughput and that is one of the best single path and the aggregated path in the multipath transmission mode, and the throughput of the aggregated path in the redundant transmission mode uses measured data obtained after switching. For example, the foregoing two throughputs may be compared to determine whether the best single path or the aggregated path is used. If the throughput measurement indicator A is 0, data is transmitted in a manner that has a higher throughput and that is one of the best single path and the aggregated path in the multipath transmission mode. For example, the throughput of the aggregated path in the multipath transmission mode is represented by data that is measured last time and that is stored by the sender.

In an implementation, the measurement value of the throughput in the redundant transmission mode and the measurement value of the throughput in multipath transmission are compared, and a transmission mode with a larger measurement value is selected as a transmission mode for subsequent data transmission. If the redundant transmission mode is selected, a path with the larger measurement value is used as the best single path for data transmission, and a value of the throughput measurement indicator A and a value of the throughput measurement indicator B are checked. In addition, if the multipath transmission mode is selected, a plurality of paths are selected by using an existing scheduling scheme (for example, a minRTT) for data transmission, and a value of the throughput measurement indicator A and a value of the throughput measurement indicator B are checked.

Because parameters in a network change in real time, to ensure that data can be always transmitted in a relatively high throughput manner, the foregoing measurement process is accompanied by a data transmission process of the connection. Therefore, before the data is sent each time, the value of the throughput measurement indicator A and the value of the throughput measurement indicator B should be detected. When the two values are both 0, use of an existing path is maintained for data transmission. If the throughput measurement indicator A is set to 1, the redundant transmission mode is entered for measurement; or if the throughput measurement indicator B is set to 1, the multipath transmission mode is entered for measurement. For specific implementation, refer to the foregoing related content of this application.

In the foregoing process, if the throughput measurement timer A expires, the value of the throughput measurement indicator A is set to 1, and the expiration time of the throughput measurement timer A is reset to 10 s. If the throughput measurement timer B expires, the value of the throughput measurement indicator B is set to 1, and the expiration time of the throughput measurement timer A is reset to 10 s. In other words, a corresponding timer is configured to set a corresponding indicator to 1, and when the timer expires or a transmission result in a transmission mode corresponding to the timer is obtained, an expiration time of the timer is reset.

In this way, in the foregoing implementation, the redundant transmission mode and the multipath transmission mode are alternated to measure the throughput of the best path and the throughput of the MP aggregated path, to transmit the data in the relatively good transmission performance manner. Obtained technical effects are as follows: When none of a buffer size, a bandwidth, or a packet loss rate is known, the data can be transmitted in a higher throughput manner, thereby preventing an aggregated throughput of multipath transmission from being less than a throughput of the best single path, that is, avoiding a negative gain of multipath transmission. In this solution, path characteristic parameter measurement and path selection are performed in real time, and need to be improved only at a single end.

As described above, latencies of the plurality of paths of the multipath transmission connection may be measured in the redundant transmission mode, to transmit the data by using the best single path or a plurality of relatively good paths. The following describes, by using a low latency requirement as an example, an implementation of transmitting the data by using the best single path of the multipath transmission connection in the redundant transmission mode.

In the example, a latency of each path is indicated by an average RTT of a plurality of packets, and a best single path is a path with a minimum average RTT. The implementation is also applicable to an MP layer in a protocol stack. Likewise, a measurement timer and a measurement indicator are used to periodically perform measurement in the redundant transmission mode, to redetermine a best single path. For noun or step that is used in the implementation and that is the same as the foregoing noun or step, refer to the foregoing descriptions. Details are not described herein again.

Data of a multipath transmission connection may be transmitted by using any path at an initial stage, or may be transmitted in a transmission manner of a redundant transmission mode. Latencies of a plurality of paths of the multipath transmission connection are measured in the redundant transmission mode, an expiration time of a initialization measurement timer is 3 seconds (the number may be changed during presetting), a measurement indicator is 1, RTTs that are on the plurality of paths and that are of 10 data packets (the number may be changed during presetting) sent in the redundant transmission mode are measured, the measurement indicator is reset to 0, the expiration time of the measurement timer is reset to 3 seconds, and an average latency of a plurality of paths is calculated. An average latency of a path is equal to an average RTT of the 10 data packets transmitted on the path, and data is transmitted by using a path with a minimum average latency in a plurality of paths.

Before a data packet is sent each time, a value of the measurement indicator is determined. If the value is 0, the data is sent by using a current path. If the value is 1, the average latency of the plurality of paths is measured in the redundant transmission mode, and the data is then transmitted by using a path with a minimum average latency in a new measurement result.

In addition, if the measurement timer expires, the measurement indicator is reset to 1, and the expiration time of the measurement timer is reset to 3 seconds.

For beneficial effects obtained in the redundant transmission mode, refer to the foregoing related descriptions. Details are not described herein again.

Figure 7:
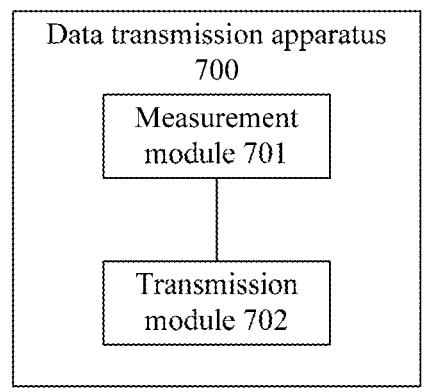
FIG. 7 is a schematic diagram of a data transmission apparatus according to this application.

FIG. 7 is a schematic structural diagram of an apparatus according to an embodiment of this application. The apparatus is configured to transmit data of a connection including a plurality of paths. The paths are links between a sender and a receiver of the connection. The apparatus includes a measurement module 701 and a transmission module 702. The apparatus may implement any method disclosed in this application.

In an embodiment corresponding to the method in FIG. 5, the measurement module 701 is configured to: measure, in a redundant transmission mode, path characteristics of the plurality of paths in the redundant transmission mode, where the redundant transmission mode is a transmission mode in which same data is transmitted on the plurality of paths; and measure, in a multipath transmission mode, a path characteristic of an aggregated path in the multipath transmission mode, where the multipath transmission mode is a transmission mode in which different data is transmitted on the plurality of paths, and the path characteristic of the aggregated path is a path characteristic of a single path when the plurality of paths are made equivalent to the single path.

The transmission module 702 is configured to: when a path characteristic of a best single path is superior to the path characteristic of the aggregated path in the multipath transmission mode, transmit the data of the connection by using the best single path, where the best single path is a path that has a best path characteristic measured in the redundant transmission mode and that is in the plurality of paths; and when the path characteristic of the aggregated path in the multipath transmission mode is superior to the path characteristic of the best single path, transmit the data of the connection by using the multipath transmission mode.

For explanations, descriptions, implementations, and beneficial effects of this embodiment, refer to descriptions in other parts of this application. Details are not described herein again.

Another embodiment corresponds to a case in which redundant transmission is performed for measurement to use a best single path. The measurement module 701 is configured to measure, in a redundant transmission mode, path characteristics of the plurality of paths in the redundant transmission mode, where the redundant transmission mode is a transmission mode in which same data is transmitted on the plurality of paths. The transmission module 702 is configured to transmit the data of the connection by using one or more paths that are of the plurality of paths and that include the best single path, where the best single path is a path that has a best path characteristic measured in the redundant transmission mode and that is in the plurality of paths.

For explanations, descriptions, implementations, and beneficial effects of this embodiment, refer to descriptions in other parts of this application, for example, descriptions of an implementation of the method in this case. Details are not described herein again.

Figure 6:
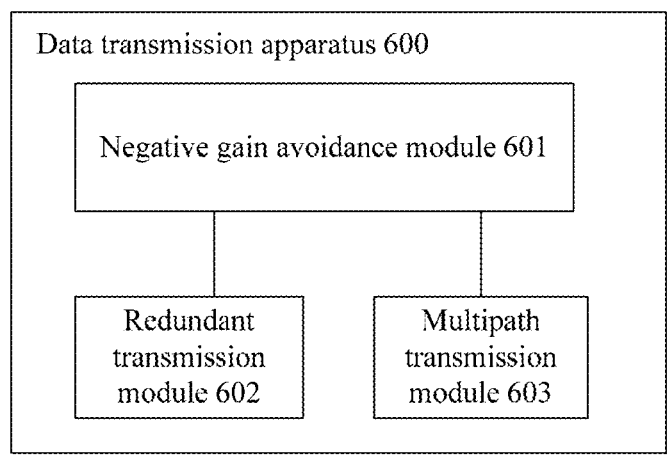
FIG. 6 is a schematic diagram of a data transmission apparatus according to this application.

In addition, in a scenario in which a negative gain is reduced, it may be considered that the measurement module 701 in FIG. 7 corresponds to the negative gain avoidance module 601 in FIG. 6, and it may be considered that the transmission module 702 corresponds to the redundant transmission module 602 and the multipath transmission module 603 in FIG. 6.

Figure 8:
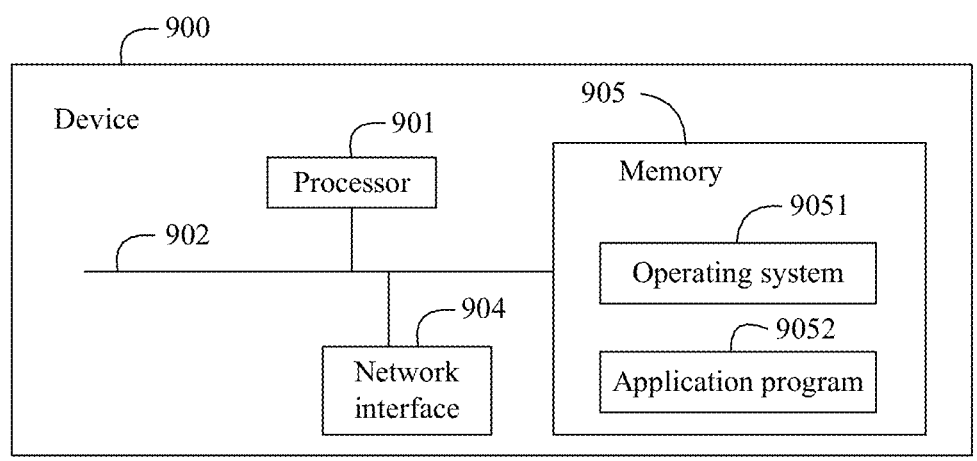
FIG. 8 is a schematic diagram of a data transmission device according to this application.

FIG. 8 is a schematic structural diagram of a device according to an embodiment of this application. The device 900 includes: at least one processing circuit 901, a communications interface 904, a storage medium 905, and at least one communications bus 902. The communications interface 904 includes at least one physical network interface card. The communications bus 902 is configured to implement connection and communication between these components. The storage medium 905 stores code used to perform any method disclosed in this application.

In an implementation, the device 900 may be a terminal device. When the device 900 is a terminal device, the device 900 optionally includes a user interface 903, a display (such as a touchscreen, an LCD, a CRT, a holographic imaging device, or a projector), a keyboard or a click device (such as a mouse, a trackball, a touch board, or a touchscreen). The storage medium 905 may include a read-only memory and a random access memory, and provide an instruction and data for the processing circuit 901. A part of the storage medium 905 may further include a non-volatile random access memory (NVRAM).

In some implementations, for example, when the device is a terminal or a server, the storage medium 905 stores the following elements: an executable module or a data structure, or a subset or an extended set thereof. For example, the storage medium 905 includes: an operating system 9051 that includes various system programs such as a frame layer, a kernel library layer, and a driver layer and that is configured to implement various basic services and process a hardware-based task; and an application program module 9052 that includes various application programs such as a launcher (launcher), a media player (Media Player), and a browser (Browser) and that is configured to implement various application services. When the device is a gateway, the storage medium 905 may store only program code required for performing the method described above.

In addition, when the device is a terminal, for an implementation, reference may be made to a corresponding architectural diagram of the terminal and related descriptions in FIG. 3. The device may invoke a program in the storage medium 905 by using the processing circuit 901, to make the processing circuit 901 perform the foregoing methods by using the communications interface 904. For specific implementations, related descriptions, and beneficial effects, refer to the foregoing. Details are not described herein again. For example, the processing circuit 901 may implement, by using the communications interface 904, functions of the modules in the apparatuses shown in FIG. 6 and FIG. 7. For example, the redundant transmission module 602, the multipath transmission module 603, and the transmission module 702 may be implemented by communications interfaces invoked by different progresses or threads.

Another embodiment of this application further records a chip or a storage medium. The chip or the storage medium may be disposed on the sender described above, and be configured to: perform the method described in this application, or store code used to perform the method described in this application.

A person of ordinary skill in the art may understand that all or some of the processes of the methods in the embodiments may be implemented by a computer program instructing related hardware (such as a processor). The program may be stored in a computer readable storage medium. When the program runs, the processes of the method in one of the embodiments may be performed. The foregoing storage medium may be a magnetic disk, an optical disc, a read-only memory (Read-Only Memory, ROM), or a random access memory (Random Access Memory, RAM).

The foregoing is a data transmission method and apparatus provided by the embodiments of this application. The foregoing embodiments are merely intended to help understand the method and core idea of this application. In addition, a person of ordinary skill in the art makes modifications to the implementations and the application scope according to the idea of this application. Therefore, this specification shall not be construed as a limitation on this application.

What is claimed is:

1. A data transmission method, wherein the method is applied to a connection comprising a plurality of paths, and the method comprises:
  measuring, in a multipath transmission mode, a path characteristic of an aggregated path in the multipath transmission mode, wherein the path characteristic of the aggregated path is a path characteristic of a single path when the plurality of paths are made equivalent to the single path;
  measuring, in a redundant transmission mode, path characteristics of the plurality of paths in the redundant transmission mode; and
  wherein at least one of the following occurs;
    when a path characteristic of a best single path is superior to the path characteristic of the aggregated path in the multipath transmission mode, transmitting data of the connection by using the best single path, wherein the best single path is a path that has a best path characteristic measured in the redundant transmission mode and that is in the plurality of paths; or
    when the path characteristic of the aggregated path in the multipath transmission mode is superior to the path characteristic of the best single path, transmitting the data of the connection by using the multipath transmission mode.

2. The method according to claim 1, wherein a parameter that represents the path characteristic is at least one of a latency, a bandwidth, a throughput, a packet loss rate, a packet loss range, or a congestion window value.

3. The method according to claim 1, wherein the method further comprises:
  performing switching from the best single path or the multipath transmission mode to the redundant transmission mode;
  remeasuring the path characteristics of the plurality of paths in the redundant transmission mode; and
  transmitting the data of the connection in a remeasured better path characteristic manner between a best single path obtained and the multipath transmission mode.

4. The method according to claim 1, wherein a parameter representing the path characteristic is a throughput, and a higher throughput indicates a better path characteristic, and the measuring, in a redundant transmission mode, path characteristics of the plurality of paths in the redundant transmission mode comprises:
  measuring throughputs of the plurality of paths in a plurality of rounds within a period of time in the redundant transmission mode, to obtain multi-round measurement results; and
  for each of the plurality of paths, using an average value of the multi-round measurement results of the each of the plurality of paths as a throughput of the each of the plurality of paths measured during redundant transmission.

5. The method according to claim 1, wherein a timer for the multipath transmission mode and a timer for the redundant transmission mode are disposed on a sender, an indicator of updating a redundant measurement value and an indicator of updating a multipath measurement value are set on the sender, the indicator of updating a redundant measurement value indicates whether a measurement is in the redundant transmission mode, the indicator of updating a multipath measurement value indicates whether the measurement is in the multipath transmission mode, and the method further comprises:
resetting the timer for the multipath transmission mode when the timer for the multipath transmission mode expires; and resetting the timer for the redundant transmission mode when the timer for the redundant transmission mode expires.

6. The method according to claim 5, wherein the method further comprises:
setting the indicator of updating a multipath measurement value to 1 when the timer for the multipath transmission mode expires;
setting the indicator of updating a redundant measurement value to 1 when the timer for the redundant transmission mode expires;
after the measuring a path characteristic of an aggregated path in the multipath transmission mode, setting the indicator of updating a multipath measurement value to 0 and resetting the timer for the multipath transmission mode; and
after the measuring path characteristics of the plurality of paths in the redundant transmission mode, setting the indicator of updating a redundant measurement value to 0 and resetting the timer for the redundant transmission mode.

7. The method according to claim 1, wherein the connection is a multipath transmission control protocol (MPTCP) connection, and the method further comprises:
transmitting the data in a slow start stage of the MPTCP connection by using the redundant transmission mode;
measuring, in the redundant transmission mode, the path characteristic of the aggregated path in the redundant transmission mode in a plurality of rounds; and
when it is determined a plurality of times that a rate of a change between a path characteristic measured in a round and a path characteristic measured in a previous round is less than a preset value, measuring the path characteristics of the plurality of paths in the redundant transmission mode.

8. A data transmission device, wherein the device comprises at least one processor, a communications interface, and a storage medium, the storage medium stores a protocol stack program, the communications interface is configured to receive a data packet from another device and send a data packet to the another device by using an instruction in the storage medium, and the storage medium comprises instructions for execution by the at least one processor, wherein the instructions, when executed by the at least one processor, cause the device to perform the following operations:
measuring, in a multipath transmission mode, a path characteristic of an aggregated path in the multipath transmission mode, wherein the path characteristic of the aggregated path is a path characteristic of a single path when a plurality of paths are made equivalent to the single path, wherein the plurality of paths are comprised in a connection;
measuring, in a redundant transmission mode, path characteristics of the plurality of paths in the redundant transmission mode; and
wherein at least one of the following occurs:
when a path characteristic of a best single path is superior to the path characteristic of the aggregated path in the multipath transmission mode, transmitting data of the connection by using the best single path, wherein the best single path is a path that has a best path characteristic measured in the redundant transmission mode and that is in the plurality of paths; or
when the path characteristic of the aggregated path in the multipath transmission mode is superior to the path characteristic of the best single path, transmitting the data of the connection by using the multipath transmission mode.

9. The device according to claim 8, wherein the operations further comprise:
performing switching from the best single path or the multipath transmission mode to the redundant transmission mode;
remeasuring the path characteristics of the plurality of paths in the redundant transmission mode; and
transmitting the data of the connection in a remeasured better path characteristic manner between a best single path obtained and the multipath transmission mode.

10. The device according to claim 8, wherein a parameter representing the path characteristic is a throughput, and a higher throughput indicates a better path characteristic, and the measuring, in a redundant transmission mode, path characteristics of the plurality of paths in the redundant transmission mode comprises:
measuring throughputs of the plurality of paths in a plurality of rounds within a period of time in the redundant transmission mode, to obtain multi-round measurement results; and
for each of the plurality of paths, using an average value of the multi-round measurement results of the each of the plurality of paths as a throughput of the each of the plurality of paths measured during redundant transmission.

11. The device according to claim 8, wherein a timer for the multipath transmission mode and a timer for the redundant transmission mode are disposed on a sender, an indicator of updating a redundant measurement value and an indicator of updating a multipath measurement value are set on the sender, the indicator of updating a redundant measurement value indicates whether a measurement is in the redundant transmission mode, the indicator of updating a multipath measurement value indicates whether the measurement is in the multipath transmission mode, and the operations further comprise:
resetting the timer for the multipath transmission mode when the timer for the multipath transmission mode expires; and resetting the timer for the redundant transmission mode when the timer for the redundant transmission mode expires.

12. The device according to claim 11, wherein the operations further comprise:
setting the indicator of updating a multipath measurement value to 1 when the timer for the multipath transmission mode expires;

setting the indicator of updating a redundant measurement value to 1 when the timer for the redundant transmission mode expires;

after the measuring a path characteristic of an aggregated path in the multipath transmission mode, setting the indicator of updating a multipath measurement value to 0 and resetting the timer for the multipath transmission mode; and after the measuring path characteristics of the plurality of paths in the redundant transmission mode, setting the indicator of updating a redundant measurement value to 0 and resetting the timer for the redundant transmission mode.

13. A non-transitory computer-readable medium storing computer instructions for data transmission, that when executed by one or more processors, cause the one or more processors to perform the following operations:

measuring, in a multipath transmission mode, a path characteristic of an aggregated path in the multipath transmission mode, wherein the path characteristic of the aggregated path is a path characteristic of a single path when a plurality of paths are made equivalent to the single path;

measuring, in a redundant transmission mode, path characteristics of the plurality of paths in the redundant transmission mode; and wherein at least one of the following occurs;

when a path characteristic of a best single path is superior to the path characteristic of the aggregated path in the multipath transmission mode, transmitting data of a connection by using the best single path, wherein the best single path is a path that has a best path characteristic measured in the redundant transmission mode and that is in the plurality of paths, and the connection comprises the plurality of paths; or when the path characteristic of the aggregated path in the multipath transmission mode is superior to the path characteristic of the best single path, transmitting the data of the connection by using the multipath transmission mode.

14. The medium according to claim 13, wherein the operations further comprise:

performing switching from the best single path or the multipath transmission mode to the redundant transmission mode;

remeasuring the path characteristics of the plurality of paths in the redundant transmission mode; and transmitting the data of the connection in a remeasured better path characteristic manner between a best single path obtained and the multipath transmission mode.

15. The medium according to claim 13, wherein a parameter representing the path characteristic is a throughput, and a higher throughput indicates a better path characteristic, and the measuring, in a redundant transmission mode, path characteristics of the plurality of paths in the redundant transmission mode comprises:

measuring throughputs of the plurality of paths in a plurality of rounds within a period of time in the redundant transmission mode, to obtain multi-round measurement results; and for each of the plurality of paths, using an average value of the multi-round measurement results of the each of the plurality of paths as a throughput of the each of the plurality of paths measured during redundant transmission.

16. The medium according to claim 13, wherein a timer for the multipath transmission mode and a timer for the redundant transmission mode are disposed on a sender, an indicator of updating a redundant measurement value and an indicator of updating a multipath measurement value are set on the sender, the indicator of updating a redundant measurement value indicates whether a measurement is in the redundant transmission mode, the indicator of updating a multipath measurement value indicates whether the measurement is in the multipath transmission mode, and the operations further comprise:

resetting the timer for the multipath transmission mode when the timer for the multipath transmission mode expires; and resetting the timer for the redundant transmission mode when the timer for the redundant transmission mode expires.

* * * * *